(12) United States Patent
Fernandez-Nieves et al.

(10) Patent No.: US 11,654,612 B2
(45) Date of Patent: May 23, 2023

(54) 3D PRINTING USING PHASE CHANGING MATERIALS AS SUPPORT

(71) Applicants: University of Florida Research Foundation, Inc., Gainesville, FL (US); Georgia Tech Research Corporation, Atlanta, GA (US)

(72) Inventors: Alberto Fernandez-Nieves, Suwanee, GA (US); Thomas Ettor Angelini, Gainesville, FL (US); Ya-Wen Chang, Alpharetta, GA (US); Samantha M. Marquez, New Haven, CT (US)

(73) Assignees: University of Florida Research Foundation, Inc., Gainesville, FL (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 17/519,752

(22) Filed: Nov. 5, 2021

(65) Prior Publication Data
US 2022/0055287 A1     Feb. 24, 2022

Related U.S. Application Data

(63) Continuation of application No. 15/533,222, filed as application No. PCT/US2015/064063 on Dec. 4, 2015, now Pat. No. 11,192,292.
(Continued)

(51) Int. Cl.
*B29C 64/106* (2017.01)
*B33Y 70/00* (2020.01)
(Continued)

(52) U.S. Cl.
CPC .......... *B29C 64/106* (2017.08); *B29C 64/153* (2017.08); *B29C 64/209* (2017.08);
(Continued)

(58) Field of Classification Search
CPC ................................................... B29C 64/259
See application file for complete search history.

(56) References Cited

U.S. PATENT DOCUMENTS

| 2,340,110 A | 1/1944 | D Alelio |
| 2,340,111 A | 1/1944 | D'Alelio et al. |

(Continued)

FOREIGN PATENT DOCUMENTS

| CA | 2822487 | 7/2012 |
| CN | 1450953 | 10/2003 |

(Continued)

OTHER PUBLICATIONS

Izidoro, Dayane, et al. "Sensory evaluation and rheological behavior of commercial mayonnaise." International journal of food engineering 3.1 (2007). (Year: 2007).*

(Continued)

*Primary Examiner* — Galen H Hauth
(74) *Attorney, Agent, or Firm* — Thomas | Horstemeyer, LLP

(57) ABSTRACT

A method or apparatus for three-dimensionally printing. The method may comprise causing a phase change in a region of the first material by applying focused energy to the region using a focused energy source, and displacing the first material with a second material. The apparatus may comprise a container configured to hold a first material, a focused energy source configured to cause a phase change in a region of the first material by applying focused energy to the region, and an injector configured to displace the first material with a second material. The first material may comprise a yield stress material, which is a material exhibiting Herschel-Bulkley behavior. The yield stress material may comprise a soft granular gel. The second material may comprise one or more cells.

18 Claims, 22 Drawing Sheets

Related U.S. Application Data

(60) Provisional application No. 62/088,385, filed on Dec. 5, 2014.

(51) Int. Cl.
| | | |
|---|---|---|
| *B33Y 10/00* | (2015.01) | |
| *B29C 64/40* | (2017.01) | |
| *B33Y 30/00* | (2015.01) | |
| *B29C 64/259* | (2017.01) | |
| *B29C 64/153* | (2017.01) | |
| *B29C 64/209* | (2017.01) | |
| *B29K 33/00* | (2006.01) | |
| *B29K 105/00* | (2006.01) | |

(52) U.S. Cl.
CPC ............ *B29C 64/259* (2017.08); *B29C 64/40* (2017.08); *B33Y 10/00* (2014.12); *B33Y 30/00* (2014.12); *B33Y 70/00* (2014.12); *B29K 2023/06* (2013.01); *B29K 2033/08* (2013.01); *B29K 2033/26* (2013.01); *B29K 2105/0061* (2013.01); *B29K 2105/251* (2013.01)

(56) References Cited

U.S. PATENT DOCUMENTS

| | | | |
|---|---|---|---|
| 2,533,635 A | 12/1950 | Seymour et al. | |
| 3,940,351 A | 2/1976 | Schlatzer, Jr. | |
| 4,062,817 A | 12/1977 | Westerman | |
| 4,631,557 A | 12/1986 | Cooke et al. | |
| 5,034,486 A | 7/1991 | Tzai et al. | |
| 5,034,487 A | 7/1991 | Tazi et al. | |
| 5,034,488 A | 7/1991 | Tazi et al. | |
| 5,073,491 A | 12/1991 | Familletti | |
| 5,078,994 A | 1/1992 | Nair et al. | |
| 5,310,779 A | 5/1994 | Lai | |
| 5,349,030 A | 9/1994 | Long, II et al. | |
| 5,470,900 A | 11/1995 | Sasaki et al. | |
| 5,697,441 A | 12/1997 | Vercaemer et al. | |
| 6,279,655 B1 | 8/2001 | Pafitis et al. | |
| 6,375,880 B1 | 4/2002 | Cooper et al. | |
| 6,476,147 B1 | 11/2002 | Sullivan et al. | |
| 6,486,901 B1 | 11/2002 | Deboer et al. | |
| 6,936,212 B1 | 8/2005 | Crawford | |
| 6,942,830 B2 | 9/2005 | Mühaupt et al. | |
| 7,049,346 B1 | 5/2006 | Van Bladel et al. | |
| 7,064,151 B1 | 6/2006 | Berge et al. | |
| 7,179,872 B2 | 2/2007 | Mccormick et al. | |
| 7,285,237 B2 | 10/2007 | Newell et al. | |
| 8,133,341 B2 | 3/2012 | Nealey et al. | |
| 10,150,258 B2 | 12/2018 | Feinberg et al. | |
| 2004/0101518 A1 | 5/2004 | Vacanti et al. | |
| 2004/0120920 A1 | 6/2004 | Lion et al. | |
| 2004/0242837 A1 | 12/2004 | Toyoda et al. | |
| 2005/0247357 A1 | 11/2005 | Welle | |
| 2005/0282934 A1 | 12/2005 | Brinkmann et al. | |
| 2006/0136058 A1 | 6/2006 | Pietrzak | |
| 2006/0156978 A1 | 7/2006 | Lipson et al. | |
| 2006/0211790 A1 | 9/2006 | Dimotakis et al. | |
| 2009/0101271 A1 | 4/2009 | Ishida | |
| 2009/0171001 A1 | 7/2009 | Lin et al. | |
| 2010/0069522 A1 | 3/2010 | Linhardt et al. | |
| 2010/0102415 A1 | 4/2010 | Millward et al. | |
| 2010/0137534 A1 | 6/2010 | Magnet et al. | |
| 2010/0183977 A1 | 7/2010 | Wang et al. | |
| 2010/0184147 A1 | 7/2010 | Cheng et al. | |
| 2010/0304088 A1 | 12/2010 | Steeman et al. | |
| 2010/0321448 A1 | 12/2010 | Buestgens et al. | |
| 2011/0064810 A1 | 3/2011 | Ghanavi | |
| 2011/0103174 A1 | 5/2011 | Jung et al. | |
| 2011/0256085 A1 | 10/2011 | Talingting Pabalan et al. | |
| 2012/0040013 A1 | 2/2012 | Owens et al. | |
| 2012/0171258 A1 | 7/2012 | Sefton et al. | |
| 2013/0004385 A1 | 1/2013 | Lee et al. | |
| 2013/0029125 A1 | 1/2013 | Tse et al. | |
| 2013/0317131 A1 | 11/2013 | Scales et al. | |
| 2013/0333891 A1 | 12/2013 | Fripp et al. | |
| 2013/0344601 A1 | 12/2013 | Soman et al. | |
| 2014/0005178 A1 | 2/2014 | Kumar et al. | |
| 2014/0186952 A1 | 7/2014 | Alsberg et al. | |
| 2014/0224349 A1 | 8/2014 | Ducrée et al. | |
| 2014/0275317 A1 | 9/2014 | Moussa | |
| 2014/0295541 A1 | 10/2014 | Nakanishi et al. | |
| 2014/0037746 A1 | 12/2014 | Trefonas, III et al. | |
| 2015/0056317 A1 | 2/2015 | Chen | |
| 2015/0057786 A1 | 2/2015 | Murphy et al. | |
| 2015/0091217 A1 | 4/2015 | Araki | |
| 2015/0093465 A1 | 4/2015 | Page | |
| 2015/0104639 A1 | 4/2015 | Schroeyers et al. | |
| 2015/0022558 A1 | 8/2015 | Ohori et al. | |
| 2015/0217024 A1 | 8/2015 | Wang et al. | |
| 2015/0031537 A1 | 11/2015 | Mehta et al. | |
| 2016/0062230 A1 | 3/2016 | Wu et al. | |
| 2016/0106663 A1 | 4/2016 | Gulbin | |
| 2016/0167312 A1* | 6/2016 | Feinberg ............... B29C 64/118 264/239 |
| 2016/0019689 A1 | 7/2016 | Ohori et al. | |
| 2016/0215130 A1 | 7/2016 | Esseghir et al. | |

FOREIGN PATENT DOCUMENTS

| | | |
|---|---|---|
| CN | 102164661 | 8/2011 |
| CN | 203305668 U | 11/2013 |
| FR | 2583334 | 12/1986 |
| FR | 2634686 | 2/1990 |
| GB | 2500412 A | 9/2013 |
| JP | S61-98547 | 5/1986 |
| JP | 4636770 | 12/2010 |
| JP | 5167496 | 1/2013 |
| JP | 2014207886 | 11/2014 |
| KR | 1020120094954 A | 8/2012 |
| WO | 0178968 | 10/2001 |
| WO | 2006027702 | 3/2006 |
| WO | 2009139395 | 11/2009 |
| WO | 2012155110 | 11/2012 |
| WO | 2014024048 | 2/2014 |
| WO | 2014039825 | 3/2014 |
| WO | 2014049204 | 4/2014 |
| WO | 2014182885 | 11/2014 |
| WO | 2014205261 | 12/2014 |
| WO | 2014209994 | 12/2014 |
| WO | 2015019212 | 2/2015 |
| WO | 2015107333 | 7/2015 |
| WO | 2015138566 | 9/2015 |
| WO | 2016044547 | 3/2016 |
| WO | 2018187595 | 10/2018 |
| WO | 2018187780 | 10/2018 |

OTHER PUBLICATIONS

Chang et al., "Biofilm formation in geometries with different surface curvature and oxygen availability", New J. Phys. 17 (2015) 033017, 10. pgs.

Ellis et al., Curvature-induced defect unbinding and dynamics in active nematic toroids, Nature Physics | vol. 14 | Jan. 2018 | www.nature.com/naturephysics, pp. 85-93.

Ellis, Perry W et al. "Curvature-Induced Twist in Homeotropic Nematic Tori." Physical review letters vol. 121,24 (2018): 247803. doi:10.1103/PhysRevLett.121.247803.

Chang, Ya-Wen et al. "Extreme thermodynamics with polymer gel tori: Harnessing thermodynamic instabilities to induce large-scale deformations." Physical review. E vol. 98,2-1 (2018): 020501. doi:10.1103/PhysRevE.98.020501.

Fragkopoulos, Alexandros A et al. "Breakup dynamics of toroidal droplets in shear-thinning fluids." Physical review. E vol. 97,2-1 (2018): 021101. doi:10.1103/PhysRevE.97.021101.

Pairam, Ekapop et al. "Stable nematic droplets with handles." Proceedings of the National Academy of Sciences of the United States of America vol. 110,23 (2013): 9295-300. doi:10.1073/pnas.1221380110.

(56) References Cited

OTHER PUBLICATIONS

Pairam, E et al. "Stability of toroidal droplets inside yield stress materials." Physical review. E, Statistical, nonlinear, and soft matter physics vol. 90,2 (2014): 021002. doi:10.1103/PhysRevE.90.021002.
Examination Report for Indian Patent Application 201717021950 dated Nov. 16, 2020.
Sigma-Aldrich (2019) "Thermal transitions of homopolymers: Glass transition & melting point."
Antoni, D.; et al (2015) "Three-Dimensional Cell Culture: a Breakthrough in Vivo." International journal of molecular sciences, 16(3), pp. 5517-5527.
Bayliss, K., et al. (2011) "Comparing Colloidal Phase Separation Induced by Linear Polymer and by Microgel Particles." Soft Matter 7.21 : 10345-10352.
Beck, Emily C., et al. (2015) "Enabling Surgical Placement of Hydrogels Through Achieving Paste-Like Rheological Behavior in Hydrogel Precursor Solutions." Annals of biomedical engineering 43.10 : 2569-2576.
Bhattacharjee, Tapomoy, et al. (2016) "Liquid-Like Solids Support Cells in 3D." ACS Biomaterials Science & Engineering 2.10 : 1787-1795.
Conrad, Jacinta C; et al. (2008) "Structure of Colloidal Gels During Microchannel Flow." Langmuir 24.15 : pp. 7628-7634.
Derby, Brian. (2012) "Printing and Prototyping of Tissues and Scaffolds." Science 338.6109 : 921-926.
Hardin, James O., et al. (2015) "Microfluidic Printheads for Multimaterial 3D Printing of Viscoelastic Inks." Advanced materials 27.21 : 3279-3284.
Hinton, Thomas J., et al. (2016) "3D Printing PDMS Elastomer in a Hydrophilic Support Bath via Freeform Reversible Embedding." ACS biomaterials science & engineering 2.10 : 1781-1786.
International Search Report for PCT/US2016/031385 dated Aug. 11, 2016.
International Search Report for PCT/US2016/064771 dated Jan. 18, 2017.
International Search Report for PCT/US2016/017810 dated Jul. 12, 2016.
International Search Report for PCT/US2016/050175 dated Nov. 22, 2016.
International Search Report for PCT/US2016/052102 dated Dec. 30, 2016.
Jin, Yifei, et al. (2016) "Granular Gel Support-Enabled Extrusion of Three-Dimensional Alginate and Cellular Structures." Biofabrication 8.2 : 025016.
Landers, R, et al. Desktop manufacturing of complex objects, prototypes and biomedical scaffolds by means of computer-assisted design combined with computer-guided 3D plotting of polymers and reactive oligomers. Macromolecular Materials and Engineering 2000 282(1):17-21.
Liu, Guangyao,;et al (2012) "Development of Thermosensitive Copolymers of Poly (2-Methoxyethyl Acrylate-Co-Poly (Ethylene Glycol) Methyl Ether Acrylate) and their Nanogels Synthesized by RAFT Dispersion Polymerization in Water." Polymer Chemistry 3.2 : 504-513.
Moxon, Samuel Robert, (2016) "Development of Biopolymer Hydrogels as Complex Tissue ENgineering Scaffolds" Doctoral thesis, University of Huddersfield. 211 pages.
Murphy, Sean V., ; et al (2014) "3D Bioprinting of Tissues and Organs." Nature biotechnology 32.8 : 773-785.
Muth, JT, et al. Embedded 3D Printing of Strain Sensors within Highly Stretchable Elastomers; 2014, 26, pp. 6307-6312, Advanced Materials; www.advmat.de.
Pfister, Andreas, et al. (2004) "Biofunctional Rapid Prototyping for Tissue-Engineering Applications: 3D Bioplotting Versus 3D Printing." Journal of Polymer Science Part A: Polymer Chemistry 42.3 : 624-638.
Rieger, J. (1996) "The Glass Transition Temperature of Polystyrene." Journal of thermal analysis 46.3-4 : 965-972.
Schaefermeier PK, et al. Design and fabrication of three-dimensional scaffolds for tissue engineering of human heart valves. Eur Surg Res. 2009 42(1):49-53.
Search Report issued in EP Patent Application 16793291, dated Feb. 5, 2019.
Smith, D.,'Multi-Material Breakthrough for 3D Printing'[Press Release] The Technology Partnership, Sep. 4, 2013.
The Diamond Hotend [Product] RepRap.me: http://reprap.me/fronl-page-show/diamond-holend.hlml.
The Technology Partnership'. [Relevant Business; Melbourn, UK] http://www.llp.com/printing.
Tumbleston, John R., et al.(2015) "Continuous Liquid Interface Production of 3D Objects." Science 347.6228 : 1349-1352.
Office Action received in Japanese Patent Application No. 2017-557950 dated Jan. 7, 2020. [English translation provided].
Office Action received in Japanese Patent Application No. 2017-530102 dated Oct. 29, 2019. [English translation provided].
Rudert, et al. "Experimental and numerical investigation of a viscoplastic Carbopol gel injected into a prototype 3D mold cavity," J Non-Newtonian Fluid Mechanics, 2009, vol. 161, pp. 60-68.
Khalil, et al. "Multi-nozzle deposition for construction of 3D biopolymer tissue scaffolds," Rapid Prototyping Journal, 2005, vol. 11/1, pp. 9-17.
Chinese Office Action for Application No. 2015800755428, dated Feb. 15, 2019, (and English Translation), Chinese Patent Office, Beijing, China (11 total pages).
English Translation of Abstract for FR2634686, 1 page.
English Translation of Abstract for FR2583334, 1 page.
English Translation of Abstract for CN1450953, 1 page.
English Translation of Abstract for CN102164661, 1 page.
European Search Report in Appln. No. 15865693.4 dated Jul. 18, 2018, 7 pages.
Hinton et al., "Three-dimensional printing of complex biological structures by freeform reversible embedding of suspended hydrogels", Science Advances 2015, vol. 1, No. 9, pp. 1-10.
Khalil et al., "Multi-nozzle deposition for construction of 3D biopolymer tissue scaffolds", Rapid Prototyping Journal, vol. 11, No. 1, Feb. 1, 2005, pp. 9-17.
Written Opinion, dated Feb. 16, 2016, Application No. PCT/US2015/064063, 5 Pages. PCT office, USPTO.
Kun-Ta Wu, et al.; Transition from turbulent to coherent flows in confined three-dimensional active fluids; sciencemag.org; Mar. 24, 2017, vol. 355 Issue 6331; 11 pages.
E. Pairam, et al.; Stability of toroidal droplets inside yield stress materials; School of Physics, Georgia Institute of Technology, Atlanta, Georgia 30339-0430, USA, (Received Jun. 17, 2014; published Aug. 28, 2014), 4 pages.
Ekapop Pairam, et al.; Stable nematic droplets with handles; School of Physics, Georgia Institute of Technology, Atlanta, GA 30332; bInstituut-Lorentz for Theoretical Physics, Leiden University, 2333 CA, Leiden, The Netherlands; and Department of Chemistry, University of York, York YO10 5DD, United Kingdom, 6 pages.
Ya-Wen Chang et al.; Biofilm formation in geometries with different surface curvature and oxygen availability; New J. Phys 17 (2015) 033017; 11 pages.
Perry W. Ellis, et al. Curvature-induced defect unbinding and dynamics in active nematic toroids; nature physics; Georgia Institute of Technology, Atlanta, Georgia 30332, USA. 2School of Mathematics, Georgia Institute of Technology, Atlanta, Georgia 30332, USA. 9 pages.
Dimitriou C. et al., "Describing and prescribing the constitutive response of yield stress fluids using large amplitude oscillatory shear stress (LAOStress)", The Society of Rheology, Journal of Rheology 57, 27 (2013); doi: 10.1122/1.4754023, https://doi.org/10.1122/1.4754023, pp. 26-45.
Menut P. et al., "Does size matter? Elasticity of compressed suspensions of colloidal- and granular-scale microgels†", Soft Matter, 2012, 8, 156 www.rsc.org/softmatter, pp. 156-164.
Moller, Peder et al. "An attempt to categorize yield stress fluid behaviour." Philosophical transactions. Series A, Mathematical, physical, and engineering sciences vol. 367, 1909 (2009): 5139-55. doi:10.1098/rsta.2009.0194.

(56) References Cited

OTHER PUBLICATIONS

Moller, et al., "Origin of apparent viscosity in yield stress fluids below yielding", 2009 EPL 87 38004, pp. 1-7.
Mattsson, Johan et al. "Soft colloids make strong glasses." Nature vol. 462,7269 (2009): 83-6. doi:10.1038/nature08457.
P. Coussot et al., "Macroscopic vs. local rheology of yield stress fluids", J. Non-Newtonian Fluid Mech. 158 (2009) 85-90.
Steinberg, M S. "Does differential adhesion govern self-assembly processes in histogenesis? Equilibrium configurations and the emergence of a hierarchy among populations of embryonic cells." The Journal of experimental zoology vol. 173,4 (1970): 395-433. doi:10.1002/jez.1401730406.
Steinberg, M S, and L L Wiseman. "Do morphogenetic tissue rearrangements require active cell movements? The reversible inhibition of cell sorting and tissue spreading by cytochalasin B." The Journal of cell biology vol. 55,3 (1972): 606-15. doi:10.1083/jcb.55.3.606.
Steinberg, Malcolm S. "Differential adhesion in morphogenesis: a modern view." Current opinion in genetics & development vol. 17,4 (2007): 281-6. doi:10.1016/j.gde.2007.05.002.
Schotz, Eva-Maria et al. "Quantitative differences in tissue surface tension influence zebrafish germ layer positioning." HFSP journal vol. 2,1 (2008): 42-56. doi:10.2976/1.2834817.
Eastwood, M et al. "A culture force monitor for measurement of contraction forces generated in human dermal fibroblast cultures: evidence for cell-matrix mechanical signalling." Biochimica et biophysica acta vol. 1201,2 (1994): 186-92. doi:10.1016/0304-4165(94)90040-x.
Zaman, Muhammad H et al. "Migration of tumor cells in 3D matrices is governed by matrix stiffness along with cell-matrix adhesion and proteolysis." Proceedings of the National Academy of Sciences of the United States of America vol. 103,29 (2006): 10889-94. doi:10.1073/pnas.0604460103.
Provenzano, Paolo P et al. "Contact guidance mediated three-dimensional cell migration is regulated by Rho/ROCK-dependent matrix reorganization." Biophysical journal vol. 95,11 (2008): 5374-84. doi:10.1529/biophysj.108.133116.
Kraning-Rush, Casey M et al. "The role of the cytoskeleton in cellular force generation in 2D and 3D environments." Physical biology vol. 8,1 (2011): 015009. doi:10.1088/1478-3975/8/1/015009.
Lutolf, M P et al. "Synthetic matrix metalloproteinase-sensitive hydrogels for the conduction of tissue regeneration: engineering cell-invasion characteristics." Proceedings of the National Academy of Sciences of the United States of America vol. 100,9 (2003): 5413-8. doi:10.1073/pnas.0737381100.
Raeber, G P et al. "Molecularly engineered PEG hydrogels: a novel model system for proteolytically mediated cell migration." Biophysical journal vol. 89,2 (2005): 1374-88. doi:10.1529/biophysj.104.050682.
Beningo, Karen A et al. "Flexible polyacrylamide substrata for the analysis of mechanical interactions at cell-substratum adhesions." Methods in cell biology vol. 69 (2002): 325-39. doi:10.1016/s0091-679x(02)69021-1.
Isenhath, S N et al. "A mouse model to evaluate the interface between skin and a percutaneous device." Journal of biomedical materials research. Part A vol. 83,4 (2007): 915-922. doi:10.1002/jbm.a.31391.
Madden, Lauran R et al. "Proangiogenic scaffolds as functional templates for cardiac tissue engineering." Proceedings of the National Academy of Sciences of the United States of America vol. 107,34 (2010): 15211-6. doi:10.1073/pnas.1006442107.
Linnes, Michael P et al. "A fibrinogen-based precision microporous scaffold for tissue engineering." Biomaterials vol. 28,35 (2007): 5298-306. doi:10.1016/j.biomaterials.2007.08.020.
Robert A. Barry, III, "Direct-Write Assembly of 3D Hydrogel Scaffolds for Guided Cell Growth", Adv. Mater. 2009, 21, 2407-2410.
Hanson Shepherd, Jennifer N et al. "3D Microperiodic Hydrogel Scaffolds for Robust Neuronal Cultures." Advanced functional materials vol. 21,1 (2011): 47-54. doi:10.1002/adfm.201001746.
Sun, Lin et al. "Direct-write assembly of 3D silk/hydroxyapatite scaffolds for bone co-cultures." Advanced healthcare materials vol. 1,6 (2012): 729-35. doi:10.1002/adhm.201200057.
Miller, Jordan S et al. "Rapid casting of patterned vascular networks for perfusable engineered three-dimensional tissues." Nature materials vol. 11,9 (2012): 768-74. doi:10.1038/nmat3357.
Greiner, Alexandra M et al. "Micro-engineered 3D scaffolds for cell culture studies." Macromolecular bioscience vol. 12,10 (2012): 1301-14. doi:10.1002/mabi.201200132.
Xu, Changxue et al. "Scaffold-free inkjet printing of three-dimensional zigzag cellular tubes." Biotechnology and bioengineering vol. 109,12 (2012): 3152-60. doi:10.1002/bit.24591.
Gilbert, Thomas W et al. "Decellularization of tissues and organs." Biomaterials vol. 27,19 (2006): 3675-83. doi:10.1016/j.biomaterials.2006.02.014.
Crapo, P.M., et al., "An overview of tissue and whole organ decellularization processes",. Biomaterials, 2011. 32(12): p. 3233-3243.
Amensag, S. et al., "Rolling the human amnion to engineer laminated vascular tissues",. Tissue Engineering Part C: Methods, 2012. 18(11): p. 903-912.
Amensag, S., "Tuning scaffold mechanics by laminating native extracellular matrix membranes and effects on early cellular remodeling",. Journal of Biomedical Materials Research Part A, 2013.
Jin, C.Z., et al., "Human amniotic membrane as a delivery matrix for articular cartilage repair",. Tissue engineering, 2007. 13(4): p. 693-702.
34. Mligiliche, N., K. Endo, K. Okamoto, E. Fujimoto, and C. Ide, Extracellular matrix of human amnion manufactured into tubes as conduits for peripheral nerve regeneration. Journal of biomedical materials research, 2002. 63(5): p. 591-600.
35. Mohammad, J., et al., "Modulation of peripheral nerve regeneration: a tissue-engineering approach. The role of amnion tube nerve conduit across a 1-centimeter nerve gap",. Plastic and reconstructive surgery, 2000. 105(2): p. 660-666.
36. Ott, H.C., et al., "Perfusion-decellularized matrix: using nature's platform to engineer a bioartificial heart"., Nature medicine, 2008. 14(2): p. 213-221.
37. Petersen, T.H., E.A. Calle, L. Zhao, E.J. Lee, L. Gui, M.B. Raredon, K. Gavrilov, T. Yi, Z.W. Zhuang, and C. Breuer, Tissue-engineered lungs for in vivo implantation. Science, 2010. 329(5991): p. 538-541.
38. Guo, S., X. Ren, B. Wu, and T. Jiang, Preparation of the acellular scaffold of the spinal cord and the study of biocompatibility. Spinal cord, 2010. 48(7): p. 576-581.
39. Uygun, B.E., A. Soto-Gutierrez, H. Yagi, M.-L. Izamis, M.A. Guzzardi, C. Shulman, J. Milwid, N. Kobayashi, A. Tilles, and F. Berthiaume, Organ reengineering through development of a transplantable recellularized liver graft using decellularized liver matrix. Nature medicine, 2010. 16(7): p. 814-820.
40. Baiguera, S., et al."Tissue engineered human tracheas for in vivo implantation",. Biomaterials, 2010. 31(34): p. 8931-8938.
41. Roberts, G.P. and H.A. Barnes, New measurements of the flow-curves for Carbopol dispersions without slip artefacts. Rheologica acta, 2001. 40(5): p. 499-503.
42. Piau, J., Carbopol gels: Elastoviscoplastic and slippery glasses made of individual swollen sponges: Meso-and macroscopic properties, constitutive equations and scaling laws. Journal of non-newtonian fluid mechanics, 2007. 144 (1): p. 1-29.
43. Barnes, H.A., The yield stress—a review or 'παντα ρει'—everything flows? Journal of non-newtonian fluid mechanics, 1999. 81(1): p. 133-178.
44. Moller, P.C., J. Mewis, and D. Bonn, Yield stress and thixotropy: on the difficulty of measuring yield stresses in practice. Soft matter, 2006. 2(4): p. 274-283.
45. Romeo, G., A. Fernandez-Nieves, H.M. Wyss, D. Acierno, and D.A. Weitz, Temperature-Controlled Transitions Between Glass, Liquid, and Gel States in Dense p-NIPA Suspensions. Advanced Materials, 2010. 22(31): p. 3441-3445.

(56) References Cited

OTHER PUBLICATIONS

46. Bindschadler, M. and J.L. McGrath, Sheet migration by wounded monolayers as an emergent property of single-cell dynamics. J Cell Sci, 2007. 120(5): p. 876-884.
47. Trepat, X., M.R. Wasserman, T.E. Angelini, E. Millet, D.A. Weitz, J.P. Butler, and J.J. Fredberg, Physical forces during collective cell migration. Nat Phys, 2009. 5.
48. Poujade, M., E. Grasland-Mongrain, A. Hertzog, J. Jouanneau, P. Chavrier, B. Ladoux, A. Buguin, and P. Silberzan, Collective migration of an epithelial monolayer in response to a model wound. Proceedings of the National Academy of Sciences, 2007. 104(41): p. 15988-15993.
49. Szabo, B., G.J. Szollosi, B. Gonci, Z. Juranyi, D. Selmeczi, and T. Vicsek, Phase transition in the collective migration of tissue cells: Experiment and model. Physical Review E (Statistical, Nonlinear, and Soft Matter Physics), 2006. 74(6): p. 061908-5.
50. Kurten, R.C., P. Chowdhury, R.C. Sanders, Jr., L.M. Pittman, L.W. Sessions, T.C. Chambers, C.S. Lyle, B.J. Schnackenberg, and S.M. Jones, Coordinating epidermal growth factor-induced motility promotes efficient wound closure. Am J Physiol Cell Physiol, 2005. 288(1): p. C109-121.
51. Haga, H., C. Irahara, R. Kobayashi, T. Nakagaki, and K. Kawabata, Collective Movement of Epithelial Cells on a Collagen Gel Substrate. Biophysical Journal, 2005. 88(3): p. 2250-2256.
52. Farooqui, R. and G. Fenteany, Multiple rows of cells behind an epithelial wound edge extend cryptic lamellipodia to collectively drive cell-sheet movement. J Cell Sci, 2005. 118(1): p. 51-63.

\* cited by examiner

3D PRINTING USING PHASE CHANGING MATERIALS AS SUPPORT

RELATED APPLICATIONS

The present application is a continuation of co-pending U.S. Utility application Ser. No. 15/333,222 titled "3D PRINTING USING PHASE CHANGING MATERIALS AS SUPPORT" and filed on Jun. 5, 2017, wherein U.S. Utility application Ser. No. 15/333,222 is the national stage application under 35 U.S.C. § 371 of international Application Serial No. PCT/US2015/064063, titled "3D printing using phase changing materials as support" and filed on Dec. 4, 2015, which claims priority under 35 U.S.C. § 119(e) to U.S. Provisional Application Ser. No. 62/088,385, titled "3D printing using phase changing materials as support" and filed on Dec. 5, 2014, all of which are herein incorporated by reference herein in their entireties.

FEDERALLY SPONSORED RESEARCH

This invention was made with U.S. Government support under Grant #DMR0847304 awarded by the National Science Foundation. The U.S. Government has certain rights in this invention.

BACKGROUND

Use of three-dimensional scaffold as template for cell regeneration is foundational to tissue engineering. Identification of the relationship of cell response on a two-dimensional (2D) surface to that of a three-dimensional (3D) object is increasingly important as biotechnology moves from conventional 2D to 3D cell cultures, which better mimic their in vivo counterparts.

Current state of the art generation of micron-to-millimeter scale surface topography relies on micropatterning, lithography techniques, or rapid prototyping based on the integration of 3D computer-aided design (CAD) and 3D printing or an additive layer method, which require specialized equipment or facilities, and often involve tedious procedures. Substrates with complex geometry, such as cylindrical, toroidal, and spherical scaffolds are challenging and time-consuming to fabricate with the aforementioned methods.

Existing scaffold processing techniques have evolved from the more traditional subtractive approaches, which involve constant removal of materials, to conventional additive approaches, which utilize solid free form fabrication by selectively adding materials layer by layer. Current commercially available 3D printing systems involve printing a solid support at the same time as the printed structure, layer by layer. After printing, the support material is washed away and discarded.

One free forming technique is electrospinning, a method that produces nonwoven fibrous structures with fiber diameters in the range of tens of nanometer to a micrometer. The polymer solution used is fed through a syringe and extruded from the spinneret (needle tip) connected to a high-voltage, where the nanofibers are generated. The 3D printing technique also utilizes a dispensing nozzle (inkjet print head) in its free forming process to deposit polymer powder and binding liquid in each layer.

SUMMARY

Some aspects include a method for creating a three-dimensional structure within a first material. The three dimensional structure may be used, for example, as a container for a cell culture and may serve as a scaffold for shaping growing tissue. The method may involve a first material and may comprise causing a phase change in a region of the first material by applying focused energy to the region using a focused energy source, and displacing the first material in the region with a second material.

Further aspects include an apparatus for creating a three-dimensional structure. The apparatus may comprise a container configured to hold a first material, a focused energy source configured to cause a phase change in a region of the first material by applying focused energy to the region, and an injector configured to displace first material in the region with a second material.

Additional aspects include a cartridge for three-dimensionally printing. The cartridge may comprise a housing configured for insertion in a three-dimensional printing device, a recess in the housing, a first material within the recess, and an opening in the housing configured for an injector to pass through the housing into the recess and displace the first material with a second material. The first material may comprise a yield stress material. The first material may be permeable by focused energy applied to a region of the first material using a focused energy source.

Further aspects include a method for creating a three-dimensional structure within a first material. The method comprises causing a phase change in a region of the first material by applying focused energy to the region using a focused energy source and displacing the first material in the region with a second material, wherein the first material is a Herschel-Bulkley material having a yield stress less than 100 Pascals.

Additional aspects include a cartridge for three-dimensionally printing. The cartridge comprises a housing configured for insertion in a three-dimensional printing device, a recess in the housing, a first material within the recess, the first material comprising a Herschel-Bulkley material having a yield stress less than 100 Pascals, and an opening in the housing configured for an injector to pass through the housing into the recess and displace the first material with a second material, wherein the first material is permeable by focused energy applied to a region of the first material using a focused energy source.

Further aspects include an apparatus for creating a three-dimensional structure. The apparatus comprises a container holding a first material, a focused energy source configured to cause a phase change in a region of the first material by applying focused energy to the region, and an injector configured to displace first material in the region with a second material, wherein the first material is a Herschel-Bulkley material having a yield stress less than 100 Pascals.

DETAILED DESCRIPTION

Figure 1:
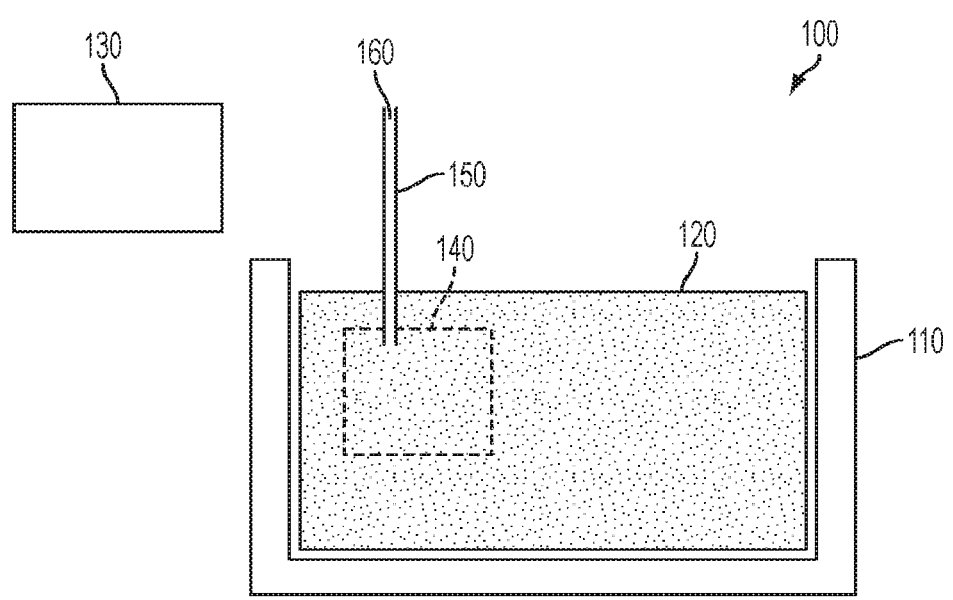
FIG. 1 is a diagram illustrating an apparatus for three-dimensionally printing according to some embodiments.

The inventors have recognized and appreciated that by printing into a temporarily phase changed material (e.g., a thixotropic or "yield stress" material), a desired structure may be printed without having to print support material as well. Rather, the phase changed material may become the support material, by conforming to the printed volume and reverting to a phase that constrains the volume. The inventors have recognized and appreciated that this approach may decrease costs and manufacturing time as compared to conventional 3D printing systems, for which the surface tension between the printed material and the support material plays a key role in limiting the minimum feature size that can be printed. The printing may be achieved, for example, by injecting a second material into the phase changed material. The phase changed material may be temporarily created, for example, in a localized region of a yield stress material by energizing that region.

In some embodiments, the material injected into the temporarily phase changed material may be miscible with it. The inventors have recognized and appreciated that the minimum feature size that can be printed may be reduced by printing with such a miscible material. In cases where the printed material is immiscible with a supporting yield stress material, the competition between surface tension and yield stress may set a limit on printable feature size, comparable to that of traditional 3D printing where the Rayleigh-Plateau instability sets the minimum feature size. However, there may be no surface tension if the two materials are miscible, and the theoretical lower limit on printed feature size may be set by (a) the size of the microgel particles that constitute the yield stress material, (b) the size of the particles in the printed material, or (c) the size of the extrusion nozzle. Most "rapid prototyping" 3D printing systems use immiscible materials. The printed material is typically hydrophobic organic material, and the support material is typically water-soluble hydrophilic material. Thus, the minimum feature size of most commercially available 3D printers is limited by surface tension. The inventors have recognized and appreciated that printing particulate materials into particulate yield stress materials—both soluble in the same materials—may eliminate the surface tension limitation, which may side-step decades of technological challenges associated with surface wetting and interfacial energy. This improvement may be possible for "water-water" based printing, and "oil-oil" based printing; particulate aqueous suspensions can be printed into aqueous yield stress materials, and suspensions of oil-soluble particles can be printed into oil-based yield stress materials.

Yield stress materials may be solids or in some other phase in which they retain their shape under applied stresses at levels below their yield stress. At applied stresses exceeding the yield stress, these materials may become fluids or in some other more malleable phase in which they may alter their shape. When the applied stress is removed, yield stress materials may become solid again. Thus, yield stress materials may provide a self-healing, self-sealing support structure into which complex structures of arbitrary design can be printed. Many yield stress materials are particulate. For example, yield stress materials may include dense packs of microgels—microscopic particles made from a swollen crosslinked polymer network. Microgels can be made from aqueous, hydrophilic polymers or from hydrophobic polymers like PDMS.

Stress may be applied to such materials in any suitable way. For example, energy may be added to such materials to create a phase charge. The energy may be in any suitable form, including, mechanical, electrical, radiant or photonic, etc. The inventors have recognized and appreciated that substrates with complex geometry like tubes, toroids, spheres, cylinders, hierarchically branched vessel networks, high aspect ratio objects, and thin closed shells, may be challenging and time-consuming to fabricate with conventional methods, and that such substrates and structures with complex geometry may be printed more easily and more quickly using temporarily phase changed materials. Moreover, printing into a temporarily phase changed material may enable applications in which the printed structure does not solidify rapidly or at all, as it may not need to do so. The fluid may remain fluid forever because the temporarily phase changed material may hold the printed structure in place after printing or extrusion. By trapping the fluid or material within the temporarily phase changed materials, the effects of surface tension, gravity, and particle diffusion can be negated, which may enable the manufacturing of finely detailed delicate materials with nearly limitless aspect ratios. Moreover, the inventors have recognized and appreciated that structures can be "un-printed" using the same materials by reversing the path of the extrusion nozzle and reversing the flow direction.

The inventors have recognized and appreciated that a wide variety of materials may be used as temporarily phase changed materials, including silicones, hydrogels, colloidal particles, and living cells. Soft polymeric materials can be crosslinked into structures and removed from the temporarily phase changed material, while uncrosslinked particulate systems like colloids and cells can be left supported within the material for seemingly infinite times. The precision and level of detail achieved by writing within a temporarily phase changed material may be limited by the size of granules of the material, which may be made at micron and sub-micron sizes. This approach may aid in the development and manufacture of precise, hierarchical cell culture scaffolds, vascular networks, complex tissues, and, in some embodiments, entire organs.

The inventors have recognized and appreciated that, while most extant tissue printing techniques involve layer-by-layer deposition in a fluid bath with a solvent-casting method, in which the extruded material solidifies by the action of a compound in the bath (like alginate extruded into a calcium chloride bath), 3D printed tissues may be generated directly inside a "bath" of their nutrient medium with no intermediate solidification step or extracellular matrix using temporarily phase changed materials. This way, living tissue cells can be printed into arbitrary 3D structures, either with or without supplemental extracellular matrix material. The temporarily phase changed support material (e.g., energized yield stress material) may provide solidity, which may work without a "curing agent" to bolster the printed structure. Moreover, the inventors have recognized and appreciated that using temporarily phase changed materials may avoid the challenges of solvent-casting methods such as the nozzle frequently getting clogged as material solidifies before exiting into the bath. Cell growth medium may be used as the solvent for aqueous microgels, making, for example, a tissue culture yield stress matrix. As an alternative example, cells can be printed into an oil-based yield stress material, using interfacial tension to maintain a well-defined surface.

The 3-D printing techniques may be applied in any of multiple ways. Specifically, the inventors have recognized and appreciated significant demands for a 3D substrate of controllable, well-defined topology and material property that will aid deconstructing the complexity of cell interactions with 3D culture systems. The inventors have also recognized and appreciated that printing into a temporarily phase changed material may enable engineering of an artificial 3D in vitro environment, which may satisfy the growing interest in isolating specific environmental cues (e.g., substrate curvature) that a 3D culture could provide.

The inventors have recognized and appreciated that by printing particulate suspensions—like cells or any commonly used inks in 2D and 3D printing—into a particulate, temporarily phase changed material such as a particulate yield stress material, the printed structure can be miscible with the support structure without loss of printing precision. This miscibility without loss of precision is possible because the printed structure may be instantly trapped in the surrounding yield stress material as soon as it is extruded. In the case of miscible components, since there may be no surface tension between printed material and support material, the fundamental limit of most 3D printing strategies may be sidestepped. There may be no driving force for the printed features to "ball up." So, aqueous materials can be printed into aqueous supports, and oil-based materials can be printed into oil-based supports. These are in addition to any case of immiscible combinations, which may also be possible.

The inventors have recognized and appreciated that printing into a temporarily phase changed material may enable fabricating a 3D substrate or a cell encapsulating matrix of defined geometries. For example, yield stress materials may exhibit shear-thinning properties, characterized by viscosity reduction under stress and a return to their original solid-like state when stress is removed. This transient flow property may enable one to shape the material via simple shearing. According to some embodiments, the stress may be provided via an injector, such as a syringe needle, shearing across the yield stress material (referred to as the outer fluid) and the injection of an immiscible liquid (referred to as the inner fluid). The stress may yield a small region of the outer fluid, which may re-solidify when the motion of the needle halts and may trap a droplet of the inner liquid. Droplets of complex topology, e.g., toroidal or crescent-shaped droplets, can be generated by rotating the continuous phase around a central axis while extruding the inner liquid from an injection needle positioned slightly off-centered. The dimensions of the torus may be controlled by (1) varying the amount of liquid injected and (2) changing the position of the needle with respect to the center of rotation. Note when combined with horizontal movement of the needle, spiral-shaped droplets can also be made.

According to some embodiments, a 2D curved surface or surfaces may be fabricated with simultaneous cell seeding. Providing an oily yield stress fluid as the outer media and an aqueous dispersion of cells as the inner fluid, spherical or non-spherical droplets containing cells may be directly formed in a single-step process. Alternatively or additionally, 2D curved surfaces of tunable chemical and mechanical properties suitable for subsequent cell culture may be fabricated. In this case, the inner fluid may comprise common hydrogel or synthetic extracellular matrix materials (ECM) precursor solution. Solidification or gelation of the precursor solution may then be induced by ultraviolet (UV) or thermo-gelling processes, after which the solid may be isolated from the yield stress material and used as cell substrate.

According to some embodiments, a 3D cell encapsulation matrix of spherical or toroidal geometry may be fabricated. Cell entrapment technique may be used in conjunction with some embodiments simply by using a mixture of hydrogel precursor solution and cell dispersion as the inner fluid. Once polymerized via changes of physical or chemical conditions, depending on the materials of choice, the final structure may again be isolated from the outer yield stress material.

The inventors recognize that the terms "yield stress" and "yield stress material" have been used and characterized in different ways in the art. For ease of description herein, the terms "yield stress" and "yield stress material" are used but, unless indicated otherwise, should be understood to be a Herschel-Bulkley yield stress determined using the Herschel-Bulkley equation $$\sigma = \sigma_y + k\dot{\gamma}^p$$

where $\sigma_y$ is yield stress, $\sigma$ is shear stress, k is viscosity index of the material, $\dot{\gamma}$ is shear rate, and p is a positive number, and a material having such a yield stress.

In addition, the inventors recognize that "yield stress" (i.e., Herschel-Bulkley yield stress) has been measured in different ways in the art. Unless indicated otherwise herein, a yield stress of a sample is determined by shearing the sample in a rheometer using plate-plate geometry and via the Herschel-Bulkley equation, via the following process. Prior to shearing, the rheometer tool surfaces may be roughened to prevent or mitigate slipping at the sample-tool interface. Using the rheometer, the sample is sheared at a variety of shear rates, extending from high shear rates (e.g., 1000 s$^{-1}$) to low shear rates (0.001 s$^{-1}$). For each shear rate, the sample is sheared for 30 seconds, after which shear stress data is collected and averaged. A series of shear stress measurements are collected sequentially for each shear rate. These shear rates are then used, via the Herschel-Bulkley equation, to determine (1) whether the material has a yield stress (i.e., a Herschel-Bulkley yield stress), and (2) the yield stress for the material. Those skilled in the art will appreciate that, for a material having a yield stress, a plot of shear stress versus shear rate will exhibit a plateau region at low shear rates, with the data points asymptotically approaching the material's yield stress at low shear rates. The yield stress is the shear stress at these low, near-zero shear rates, or an estimate of shear stress at zero strain rate determined using a low or near-zero shear rate, such as a shear rate of 10$^{-3}$ s$^{-1}$. As used herein (unless indicated otherwise), a "yield stress material" will be a material that has a yield stress determinable via this process. Those skilled in the art will appreciate that for a yield stress material (i.e., a Herschel-Bulkley yield stress material) at low shear (e.g., a near-zero shear rate), a shear stress is independent of shear rate and instead exhibits only a shear stress dependent only on an elastic component of the material.

Figure 20:
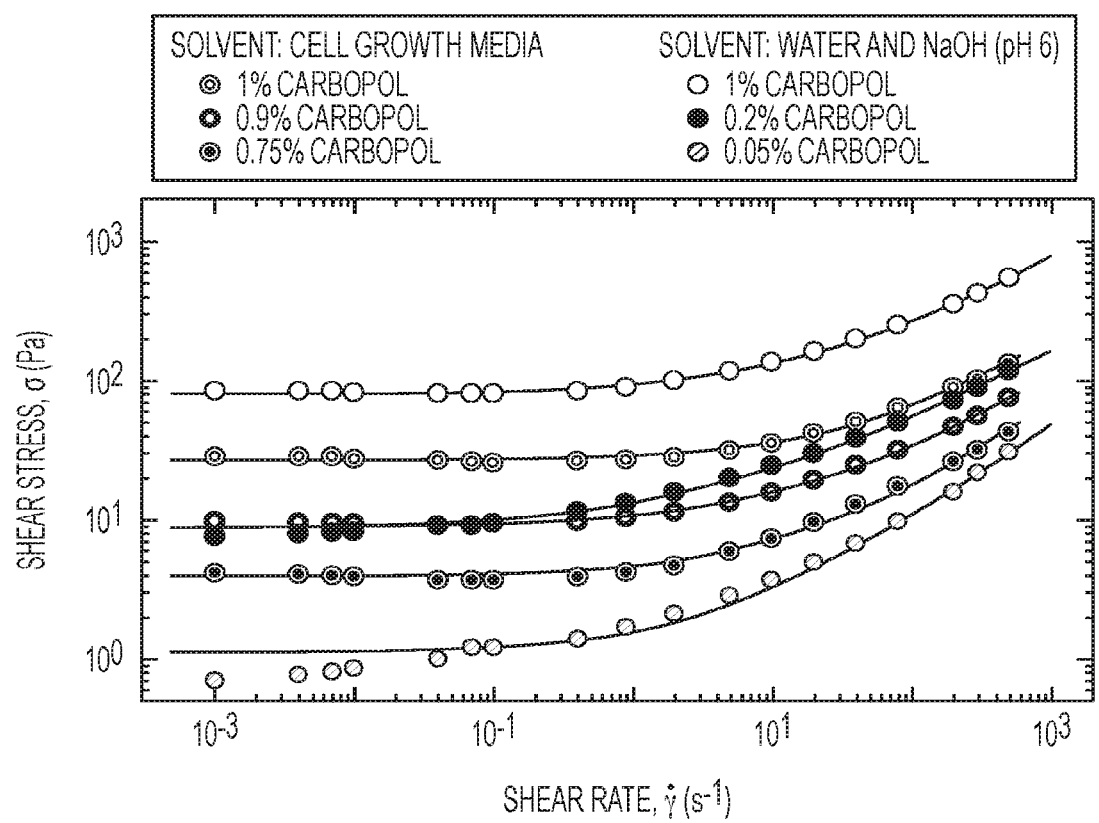
FIG. 20 is a plot of shear stress versus shear rate for some illustrative yield stress materials with which some embodiments may act.

To illustrate such behavior, FIG. 20 illustrates 6 curves of shear stress versus shear rate, for a carbomer polymer in various concentrations and immersed in various solvents. The curves show Herschel-Bulkley behavior (a plateau region) and thus correspond to materials having a yield stress. As should be appreciated from FIG. 20, the 0.05% Carbopol® in a water/NaOH solvent is nearly not a yield stress material, in that the data points barely exhibit a plateau region at low shear rate. This demonstrates that some microgels (including hydrogels) in solvents, based on other factors such as solvent or concentration, may not be yield stress materials having a yield stress (i.e., a Herschel-Bulkley yield stress).

For the tests resulting in the data of FIG. 20, Carbopol® in various concentrations was swollen in water and NaOH (at pH 6) or swollen in cell growth media (at pH 7.4). The cell growth media used was MEBM media including 10% fetal bovine serum and 1% penicillin-streptomycin. As should be appreciated from FIG. 20, the yield stress of the Carbopol® in cell growth media decreases with lower concentration. This is because the Carpobol® particles reduce in size in high-salt environments. The examples of FIG. 20 demonstrate the ability of Carbopol® and other hydrogels (e.g., other carbomer polymers) to be "tuned" to have desired yield stresses for a given application, by varying factors such as concentration and solvent.

As should be appreciated from the discussion below, yield stress materials (i.e., materials having a Herschel-Bulkley yield stress) may be desirably used in a 3D printer in embodiments, as a support material during printing. As will be appreciated from the discussion below of specific yield stress materials, the inventors have recognized and appreciated the desirability, for use as support materials during 3D printing, of yield stress materials having yield stresses in a range of 1 Pascal to 1000 Pascals, and advantageously in a range of 1 to 100 Pascals or 10 to 100 Pascals. For example, embodiments are described below in which carbomer polymers (such as Carbopol®) having yield stresses between 1 and 100 Pascals are used in 3D printing. Some embodiments may operate with yield stress materials having any yield stress below 100 Pascals, with a minimum yield stress only being defined by the lower physical limit on Herschel-Bulkley yield stresses.

Separately, the inventors have recognized and appreciated the desirability of yield stress materials having a yield stress within these same ranges of 1 to 100 Pascals or 10 to 100 Pascals that are discussed below. The inventors have recognized and appreciated that, during 3D printing in a yield stress material, motion of a printing nozzle within a bath of yield stress material may create undesired (and undesirable) "crevasses" in the material. Printing in a bath of yield stress material without spontaneous formation of undesired crevasses may be avoided by using a yield stress material with a low yield stress, such as a material (like the Carbopol® materials described below) having a yield stress below 100 Pascals. For yield stress materials that are hydrogels, an upper limit on yield stress is the hydrogel's hydrostatic pressure, determined by $\rho \cdot g \cdot h$, where $\rho$ is the density of the yield stress material, g is the acceleration due to gravity, and h is a depth of printing below the surface. For some embodiments in which living cells are being 3D printed in petri dishes and/or well plates containing a hydrogel (such as Carbopol®), the cells may be printed at a depth up to 1 cm. In such embodiments, the upper limit on yield stress (as determined from the hydrostatic pressure) is approximately 100 Pascals. Desirable hydrogel materials (including Carbopol® materials) having yield stresses up to 100 or 1000 Pascals are discussed in detail below.

Those skilled in the art that materials having a yield stress will have certain thixotropic properties, such as a thixotropic time and a thixotropic index.

As used herein, a thixotropic time is a time for shear stress to plateau following removal of a source of shear. The inventors recognize that thixotropic time may be measured in different ways. As used herein, unless indicated otherwise, thixotropic time is determined by applying to a material, for several seconds, a stress equal to 10 times the yield stress of the material, followed by dropping the stress to 0.1 times the yield stress. The amount of time for the shear rate to plateau following dropping of the stress is the thixotropic time.

As used herein, a thixotropic index (for a yield stress material) is defined as the ratio of viscosity at a strain-rate of 2 s$^{-1}$ to viscosity at a strain-rate of 20 s$^{-1}$.

Figure 21:
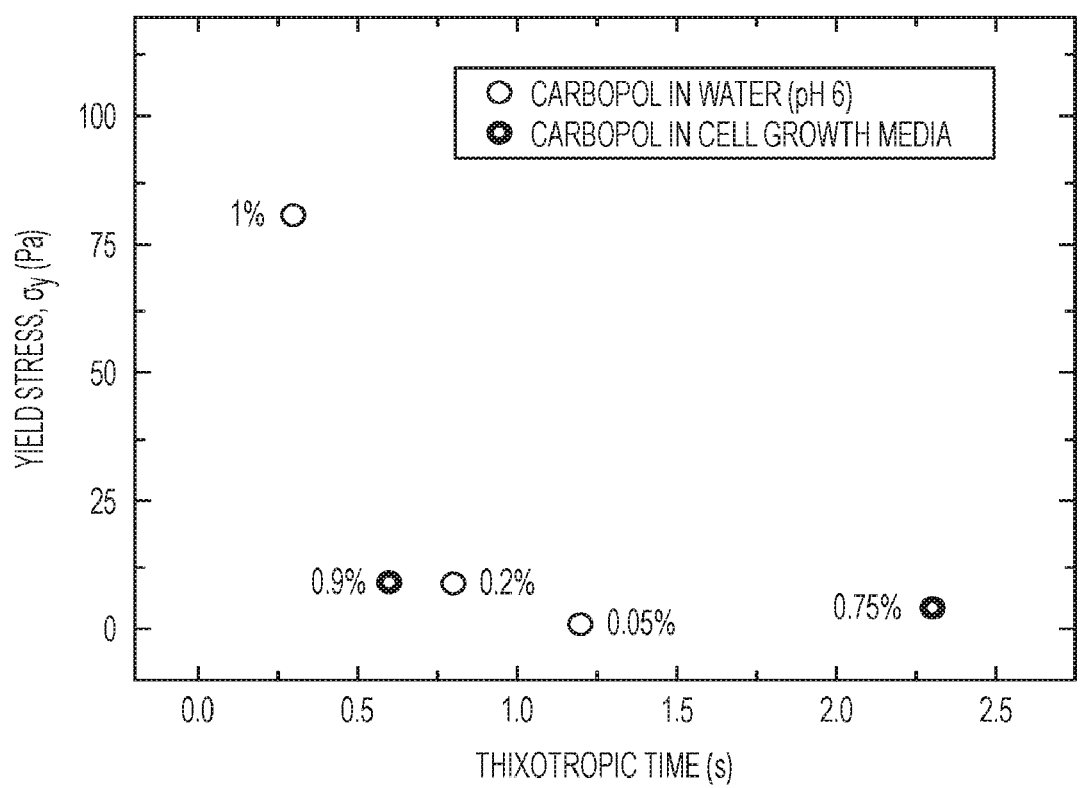
FIG. 21 is a plot of yield stress versus thixotropic time for some yield stress materials with which some embodiments may act and, for comparison, other materials that are not yield stress materials.

Yield stress materials with desirable yield stresses may also have desirable thixotropic properties, such as desirable thixotropic indexes or thixotropic times. For example, desirable yield stress materials (including hydrogel materials having a yield stress below 100 Pascals, some of which are described in detail below, such as Carbopol® materials) may have thixotropic times less than 2.5 seconds, less than 1.5 seconds, less than 1 second, or less than 0.5 seconds, and greater than 0.25 seconds or greater than 0.1 seconds. FIG. 21 is a plot of yield stress (as given by zero-shear rate stress estimate) versus thixotropic time for a variety of materials, including hydrogel solutions like the Carbopol® solutions in some of the solvents and concentrations shown in FIG. 20 and discussed in detail below. The Carbopol® solutions exhibit a yield stress below 100 Pascals (and many below 25 Pascals), as well as low thixotropic times. The thixotropic times of the Carbopol® solutions having a yield stress below 100 Pascals is less than 2.5, less than 1.5 seconds, less than 1 second, or less than 0.5 seconds, and greater than 0.25 seconds or greater than 0.1 seconds.

Figure 22:
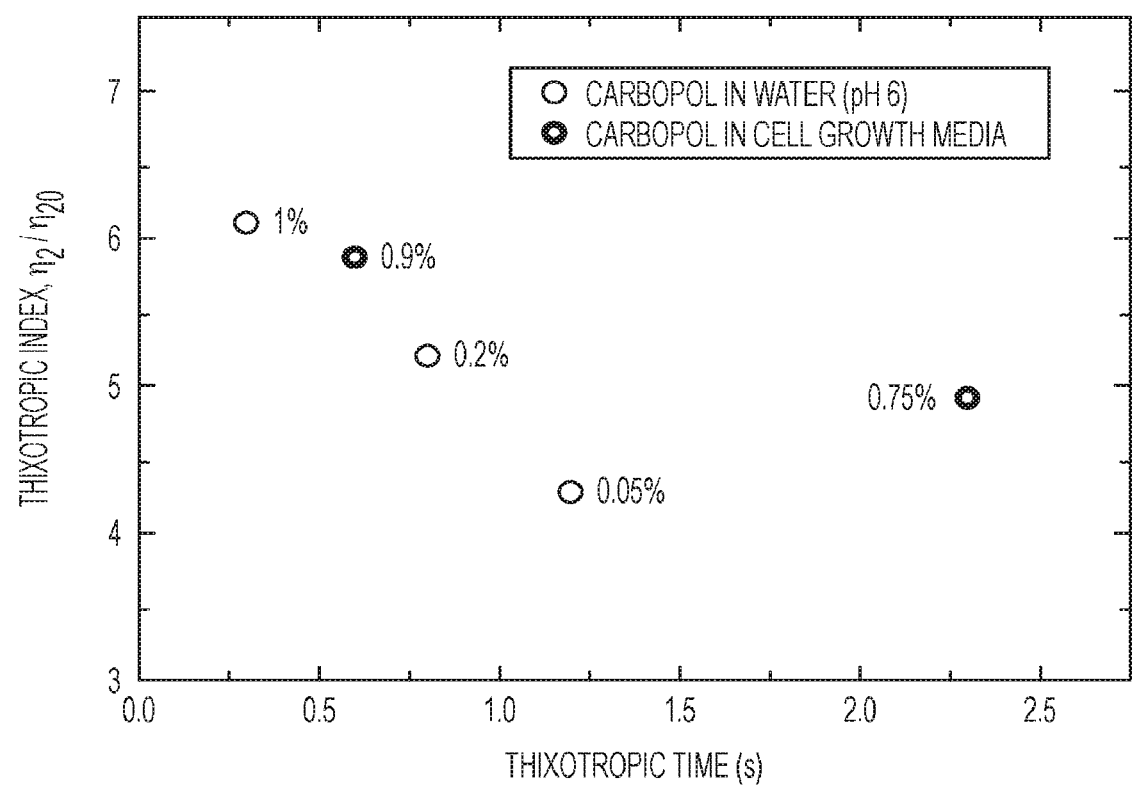
FIG. 22 is a plot of thixotropic index versus thixotropic time for some yield stress materials with which some embodiments may act and, for comparison, other materials that are not yield stress materials.

Similarly, FIG. 22 shows a plot of thixotropic index to thixotropic times, for the same solutions illustrated in FIG. 21. For hydrogel yield stress materials with a yield stress below 100 Pascals (including those discussed in detail below, like Carbopol® solutions), the thixotropic index is less than 7, less than 6.5, or less than 5, and greater than 4, or greater than 2, or greater than 1.

Desirable yield stress materials, like hydrogels such as the Carbopol® solutions described below, may thus have thixotropic times less than 2.5, less than 1.5 seconds, less than 1 second, or less than 0.5 seconds, and greater than 0.25 seconds or greater than 0.1 seconds, and/or thixotropic indexes less than 7, less than 6.5, or less than 5, and greater than 4, or greater than 2, or greater than 1.

Because of the yield stress behavior of yield stress materials, materials deposited into a yield stress material (such as through 3D printing techniques described herein) may remain fixed in place in the yield stress material, without the yield stress material or the deposited material needing to be cured or otherwise treated to reverse a phase change (e.g., by heating to cross-link, following printing). Rather, the yield stress materials permit an indefinite working time on deposition of materials inside yield stress materials, including printing of objects within yield stress materials. For example, in experiments described in detail below, printed objects stayed in place for multiple months (i.e., greater than one minute, greater than one hour, greater than one day, greater than one week, and greater than one month) without movement following deposition, without curing or cross-linking of the yield stress material or the deposited material, or otherwise without treatment. This may permit continuous printing/deposition of a material within a yield stress support material for greater than one minute, greater than one hour, greater than one day, greater than one week, or greater than one month, where continuous printing would not include ceasing for reasons related to the chemistry of the support or printed material (e.g., treating or curing) but may include ceasing for reasons related to mechanics of printing (e.g., reloading of materials to be printed or movement of print head to a different location).

Exemplary Implementation of the System

FIG. 1 illustrates an exemplary apparatus 100 for creating a three-dimensional structure. The apparatus 100 may include a container 110, a focused energy source 130, and an injector 150. The container 110 may hold a first material 120. The focused energy source 130 may cause a phase change in a region 140 of the first material 120 by applying focused energy to the region 140. The injector 150 may displace the first material 120 with a second material 160.

According to some embodiments, the container 110 may be a tub, a bowl, a box, or any other suitable container for the first material 120. The container 110 may be configured to release the first material 120. For example, the container 110 may include a resealable and/or hinged opening that may be opened when printing of the second material 160 is completed, so that the first material 120 may be removed from around the second material 160. Alternatively or additionally, the first material 120 may be washed away in whole or in part, such as by introducing organic solvents and/or increasing an electrolyte concentration of the first material. The electrolyte concentration may be increased by introducing one or more salts to the first material or otherwise increasing a concentration of one or more salts in the first material. Salts that may be used include monovalent salts, low-levels of multivalent salts. Sodium chloride, potassium chloride, or calcium chloride may be used, or salts of ammonia. The apparatus 100 may include a second injector (not illustrated in FIG. 1) for depositing one or more salts and/or organic solvents to wash away the first material, or to otherwise increase an electrolyte concentration of the first material to wash away the first material.

The first material 120 may include a thixotropic or yield stress material, or any material suitable for temporary phase changing. In some examples, the thixotropic or yield stress material may include a soft granular gel. The soft granular gel may be made from polymeric packed micro-particles. The polymeric packed micro-particles may be about 5 micrometers in diameter.

Figure 5:
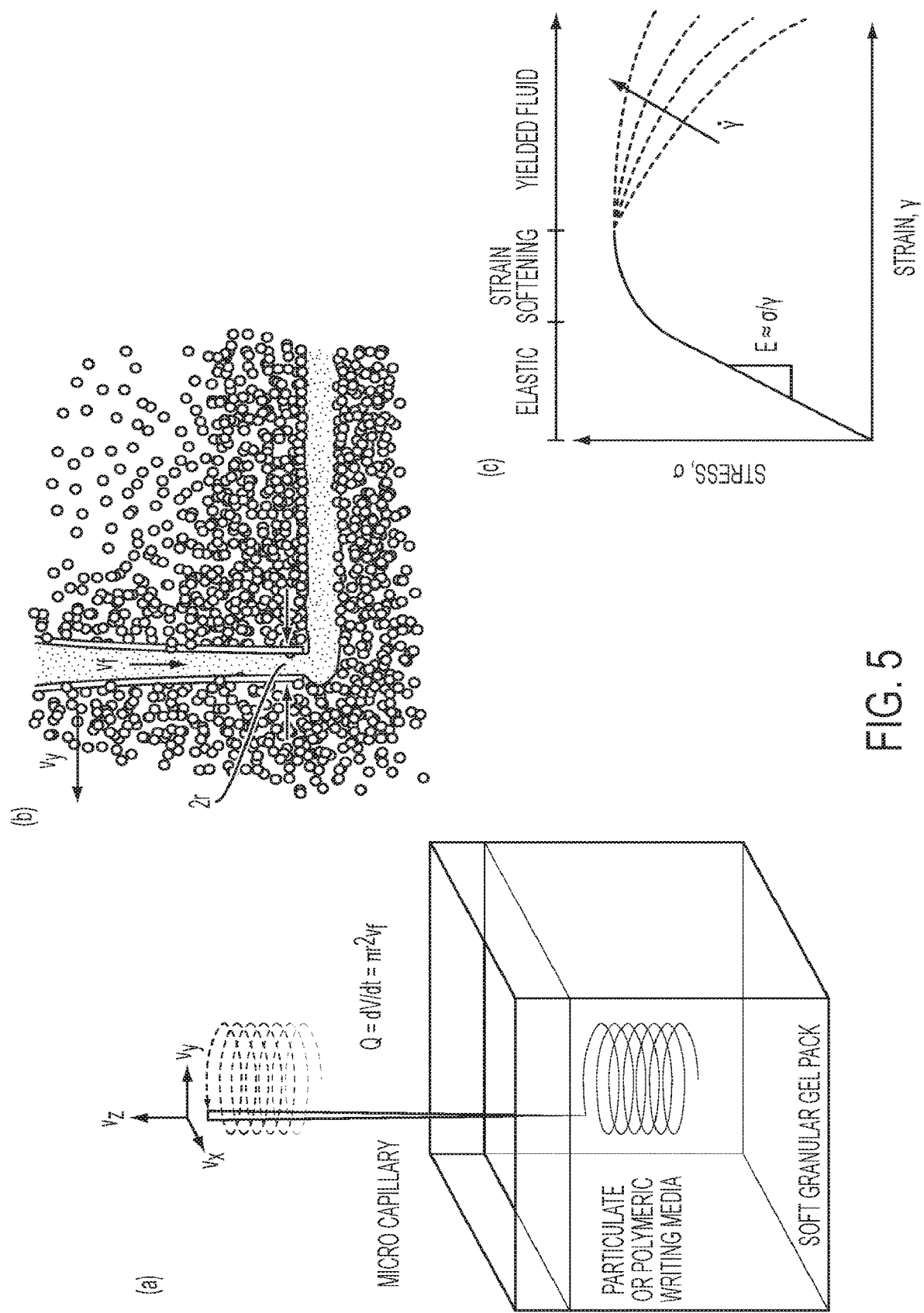
FIG. 5 schematically illustrates printing in a cartridge containing a granular gel as a 3D drawing medium.

For example, FIG. 5 illustrates (a) a capillary with a microscale tip sweeping out a complex pattern in space as a second material 160 is injected into granular gel support medium. Flow rate, Q, and tip-speed in all three directions may determine the girth of the drawn feature. Arbitrary aspect ratio objects can be generated because the drawn structure itself may not need to solidify or generate any support on its own. Additionally, FIG. 5 illustrates (b) the tip traversing solidly packed microgel particles, which may cause the support medium to fluidize and then rapidly solidify, leaving a drawn cylinder in its wake. FIG. 5 also illustrates (c) the soft granular gel medium exemplarily as a yield stress material, which may elastically deform at low shear strains, soften at intermediate strains, and fluidize at high strains.

According to some embodiments, the focused energy may include mechanical energy, such as kinetic energy due to displacement of the injector 150 relative to the first material 120. In this example, the focused energy source 130 may include the injector 150. According to some embodiments, the injector 150 may include a fine hollow tip, which may carefully trace out spatial paths within the first material 120 (e.g., a granular gel) while injecting the second material 160. The movement of the tip may locally yield and fluidize the first material 120 at the point of injection (i.e., in the region 140). Another example of mechanical energy may include ultrasonic pressure waves. Alternatively or additionally, the focused energy may include radiant energy, such as radio frequency radiation, which may be directed into the region 140.

According to some embodiments, the first material and the second material may be miscible with each other. Alternatively, the first material and the second material may be immiscible with each other. According to some embodiments, the second material may comprise extracellular matrix materials precursor solution. Alternatively or additionally, the second material may comprise one or more cells.

According to some embodiments, the focused energy source 130 may cause a reverse phase change in the region 140 of the first material 120. For example, a reverse phase change may be used to "heal" and solidify the first material 120 around the second material 160, trapping and permanently embedding the second material 160 in the wake of the injector 150. Alternatively or additionally, a reverse phase change may be used to remove the second material 160 from within the first material 120.

Figure 2:
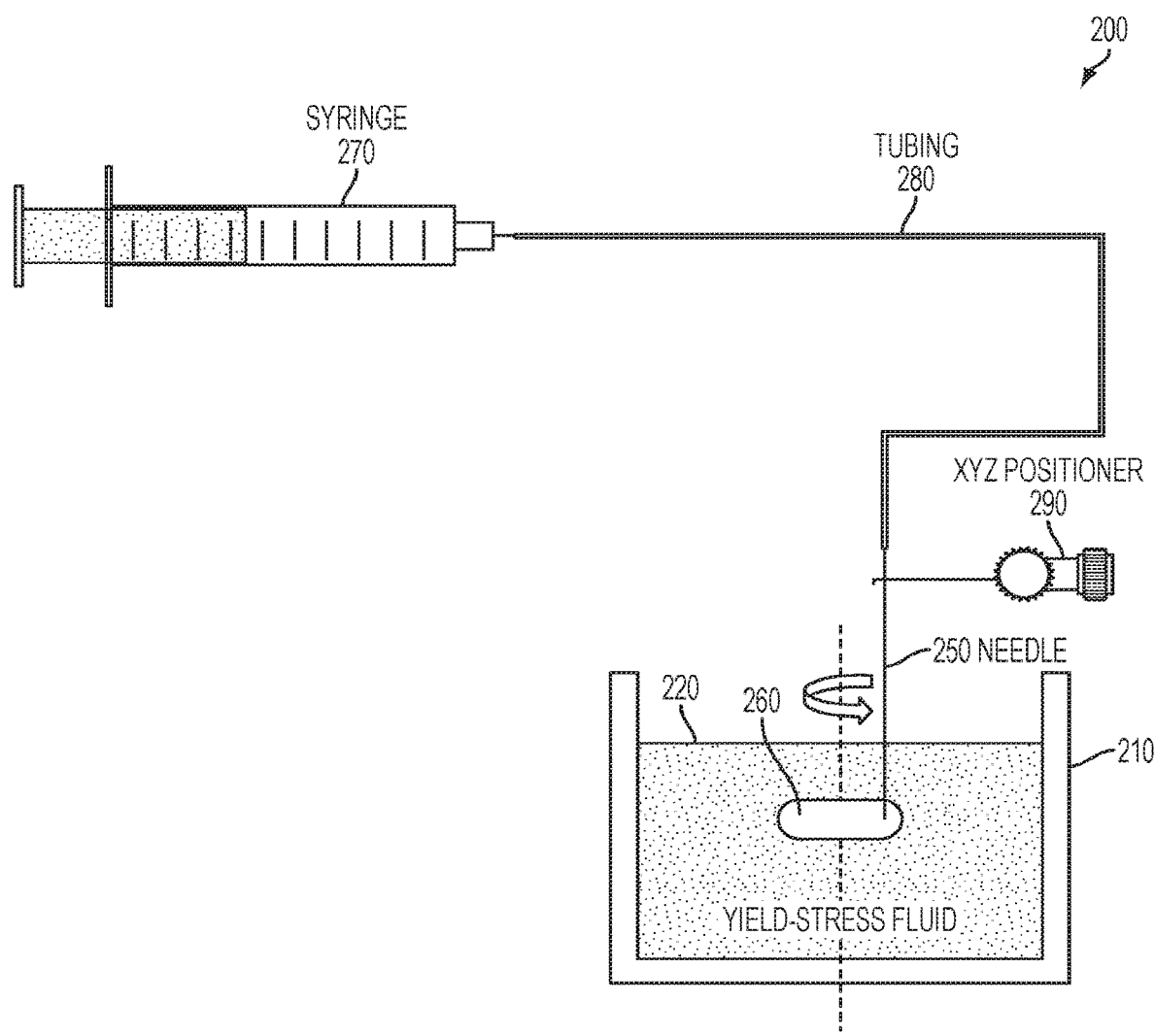
FIG. 2 is a schematic of a device for three-dimensionally printing according to some embodiments.

According to some embodiments, droplets of non-spherical geometries may be prepared by injecting an aqueous inner liquid into a rotating bath of non-polar yield stress material, as shown schematically in FIG. 2. FIG. 2 illustrates an apparatus 200 for three-dimensionally printing. The apparatus 200 may include a housing or container 210, a needle 250, a syringe 270, and tubing 280. The housing 210 may hold a first material 220. The needle 250 may displace the first material 220 with a second material 260. The tubing 280 may be connected to an output of the syringe 270 and an input of the needle 250. The syringe 270 may include the an amount of the second material 260, which it may inject via the tubing 280 and the needle 250 into the first material 220.

According to some embodiments, the apparatus 200 may include a platform (not shown) that may cause relative displacement between the first material 220 and the needle 250. Additionally, the relative displacement between the first material 220 and the needle 250 may comprise relative rotation between the first material 220 and the needle 250, as shown in FIG. 2. This relative rotation between the first material 220 and the needle 250 may comprise rotation about an axis of the first material 220, also shown in FIG. 2. According to some embodiments, the platform may cause the relative displacement between the cartridge 210 and the needle 250 at a displacement rate faster than a characteristic breakup time of a jet of the second material 260.

According to some embodiments, the apparatus 200 may further include a positioner or actuator 290. The positioner 290 may cause relative displacement between the needle 250 and the first material 220. For example, the positioner 290 may position the needle 250 three-dimensionally so that the second material 260 enters the first material 220 at the desired locations. The positioner 290 may also be used in conjunction with the platform to create specific shapes as the platform and positioner 290 each cause displacement simultaneously. For example, the platform may cause relative rotation between the first material 220 and the needle 250 while the positioner 290 may displace the needle 250 up and down, side to side, back and forth, and so on, creating any shape desired. Alternatively or additionally, the motion of the needle 250 may be synchronized with the motion of the positioner 290.

According to some embodiments, during fluid infusion, a liquid jet may be stretched by the continuous rotating motion of the outer fluid, similar to that of liquid co-flow. The principle of forming an enclosed curved jet (or toroidal droplet) inside a yield stress outer fluid may be similar to that of forming such droplets in simple Newtonian liquids (E. Priam et al. (2009), Generation and stability of toroidal droplets in a viscous liquid, Phys. Rev. Lett. 102, 234501): to perform a full rotation faster than the characteristic breakup time of the liquid jet. The temporarily phase changed portion or region of the first material 220, which may effectively be "solidified" under static conditions, may allow further stabilizing of the non-spherical geometry. For example, yield stress material may be immiscible with the inner fluid, preferably biocompatible, and may provide optical clarity as well as tunable mechanical properties.

According to some embodiments, the first material 220 and the second material 260 may allow the apparatus 200 to function without any need of additional materials, such as a filler material or fluid for filling in crevasses created during printing. Additionally, the first material 220 need not be photocrosslinkable material; rather, the first material 220 may be photocrosslinkable or unphotocrosslinkable.

According to some embodiments, the second material 260 need not be a yield stress material for use as the "ink" for printing; rather, any suitable material may be used for the second material 260. Additionally, the first material 220 may have any suitable modulus, which is not limited to a "high" modulus. For example, the modulus of the first material 220 may be anywhere in the range of 100 to 10,000 Pascals, or it may be outside this range. The yield stress of the gels may vary, depending on the desired consistency, but may generally be in the range of 1-100 Pascals, or 10-100 Pascals for some yield stress materials such as silicone elastomer dispersions.

Examples of suitable silicone elastomer dispersions may include dimethicone/vinyl dimethicone crosspolymer blends from Dow Corning Corporation (Midland, Mich.) under trade name Dow Corning® 9040 silicone elastomer (cyclopentasiloxane and dimethicone crosspolymer), DC-9041 (dimethicone and dimethicone crosspolymer), EL-9140DM (dimethicone and dimethicone crosspolymer); SFE 839, a cyclopentasiloxane (and) dimethicone/vinyl dimethicone crosspolymer from Momentive Performance Materials Inc. (Waterford, N.Y.); cyclopentasiloxane (and) cetearyl dimethicone/vinyl dimethicone crosspolymer from Momentive Performance Materials Inc. under the tradename Silsoft* Silicone Gel; KSG-15 (cyclopentasiloxane and dimethicone/vinyl dimethicone crosspolymer), KSG-16 (dimethicone and dimethicone/vinyl dimethicone crosspolymer), KSG-18 (phenyl trimethicone and dimethicone/phenyl vinyl dimethicone crosspolymer), and KSG-41 (mineral oil and vinyl dimethicone/lauryl dimethicone crosspolymer) from Shin Etsu Silicones (Akron, Ohio).

Figure 3:
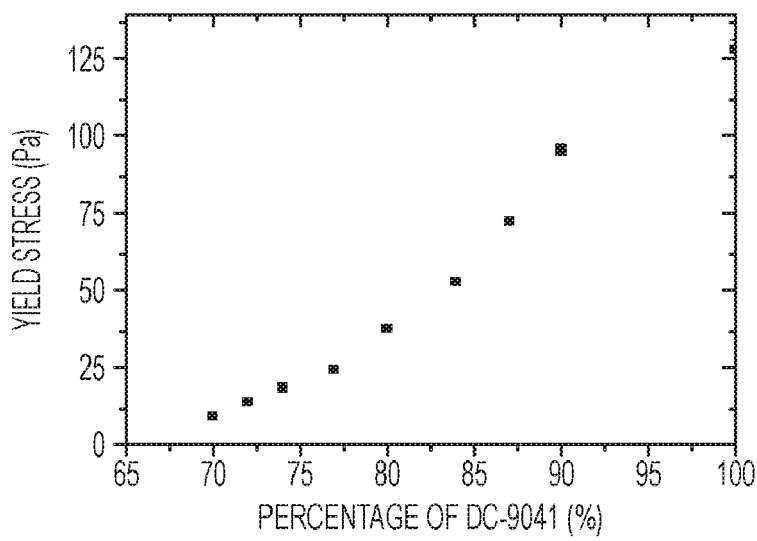
FIG. 3 is a chart of the yield stress of silicone fluid as a function of neat material concentration (with 10 cst silicone oil as solvent) according to some embodiments.

The elastomer dispersion may provide a transparent, stable viscous gel, or paste-like material typically described as thixotropic solid. The yield stress of the gels can be conveniently tuned by varying dispersion concentration, as exemplarily shown using DC-9041 with low viscosity silicone oil in FIG. 3. The common solvent in the pre-made dispersion may be a low molecular weight silicone. Other types of organic solvents can also swell the silicone elastomer, and therefore a mixture of solvents may be used.

Figure 4:
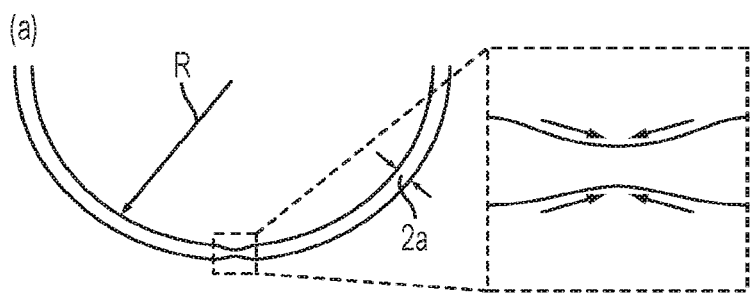
FIG. 4 illustrates (a) a schematic of the top view of an unstable torus and (b) and an example of the smallest length scale ($a_c$) achievable using silicone material of different yield stress according to some embodiments.
Figure 4:
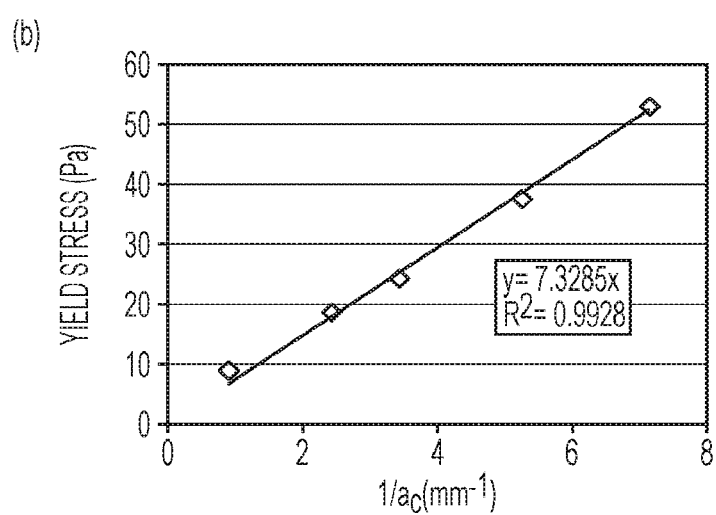
Figure 6:
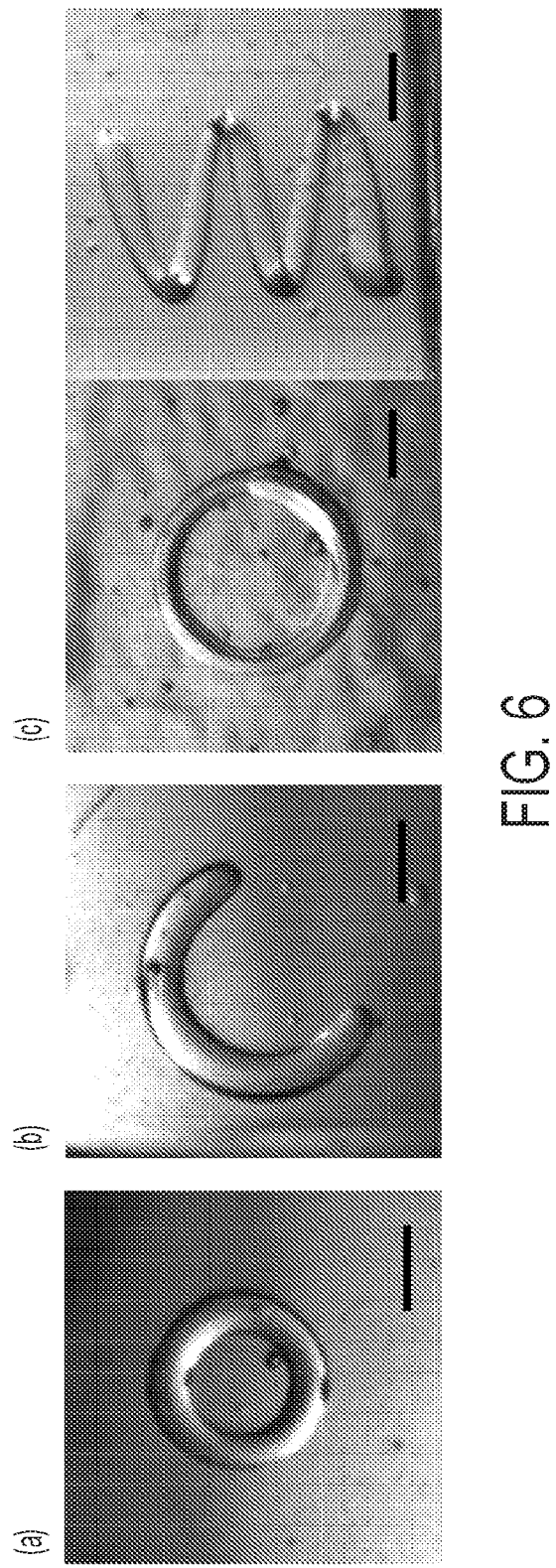
FIG. 6 illustrates structures that may be formed using techniques as described herein, including (a) toroidal, (b) crescent-shaped, and (c) spiral-shaped (left: top view; right: side view) droplets according to some embodiments. Scale bars may represent 1 millimeter.

The resolution, i.e., the smallest dimension, of the 3D structures may be determined by the yield stress of the silicone dispersion as well as the interfacial tension between the inner and outer fluids. For a pair of fluids, with outer fluid yield-stress $\tau_y$ and interfacial tension $\gamma$, the relationship between the minimum (pattern) feature size and these fluid properties may be described as follows: Liquid jets inside a yield stress material may experience surface tension driven stresses, similar to that in Newtonian liquid, where minimization of interfacial area may be preferred and may eventually lead to the breakup of jets into spherical droplets. When the yield stress of the outer fluid is greater than the surface stress ($\tau_y > \gamma/a$, a being the radius of the liquid jet), as shown in FIG. 4, the jet geometry may be stable and the breakup may not occur. Hence, resolution improvement may be achieved by either increasing $\tau_y$ and/or reducing $\gamma$. The shortest distance between neighboring tubes (inner circle diameter in the case for a torus) and the thinnest dimension of the tube (tube diameter) may usually be on the order of a hundred microns. FIG. 6 shows some examples of the different geometries that can be produced.

According to some embodiments, a blend of silicone elastomer and compatible solvent may be used directly as a cell-friendly matrix. The silicone blend of varying yield-stress may be used to form a matrix having controlled geometry and interfacial curvature for cell culturing. Droplets of cell dispersion may be contained inside the silicone elastomer, which may allow cells to disperse freely in the carrier fluid (culture media) and eventually sediment at the liquid-silicone interface. Once at the interface, cells may be able to explore regions of varying surface curvature and respond to it. Further components may be added to the carrier fluid to render the silicone surface bioactive—for example, extracellular matrix proteins (collagen or other adhesive proteins), antibodies, or drugs.

According to some embodiments, the 3D cell-encapsulating matrices or scaffolds may also include hydrogels. Some such hydrogels may be bio-compatible polymers. The hydrogels may be dispersed in solutions (e.g., solutions with cell growth medium) in various concentrations. One example of a concentration is below 2% by weight. Another concentration example is approximately 0.5% to 1% hydrogel particles by weight, and another is approximately 0.2% to about 0.7% by mass. Those skilled in the art will appreciate that other concentrations may be used. Those skilled in the art will further appreciate that, when disposed in a solution as discussed herein, hydrogel particles will swell with the solvent and may form a granular gel material, as discussed elsewhere herein. Such a granular gel may include swollen hydrogel particles having a characteristic size at a micron or submicron scale. For example, in some embodiments, a swollen hydrogel particle may have a size between about 0.1 μm and 100 μm, including 5 μm as discussed above.

An example of a hydrogel with which some embodiments may operate is a carbomer polymer, such as Carbopol®. Carbomer polymers may be polyelectrolytic, and may comprise deformable microgel particles.

Carbomer polymers are particulate, high-molecular-weight crosslinked polymers of acrylic acid with molecular weights of up to 3-4 billion Daltons. Carbomer polymers may also comprise co-polymers of acrylic acid and other aqueous monomers and polymers such as poly-ethylene-glycol.

While acrylic acid is the most common primary monomer used to form polyacrylic acid the term is not limited thereto but includes generally all α-β unsaturated monomers with carboxylic pendant groups or anhydrides of dicarboxylic acids and processing aids as described in U.S. Pat. No. 5,349,030. Other useful carboxyl containing polymers are described in U.S. Pat. No. 3,940,351, directed to polymers of unsaturated carboxylic acid and at least one alkyl acrylic or methacrylic ester where the alkyl group contains 10 to 30 carbon atoms, and U.S. Pat. Nos. 5,034,486; 5,034,487; and 5,034,488; which are directed to maleic anhydride copolymers with vinyl ethers. Other types of such copolymers are described in U.S. Pat. No. 4,062,817 wherein the polymers described in U.S. Pat. No. 3,940,351 contain additionally another alkyl acrylic or methacrylic ester and the alkyl groups contain 1 to 8 carbon atoms. Carboxylic polymers and copolymers such as those of acrylic acid and methacrylic acid also may be cross-linked with polyfunctional materials as divinyl benzene, unsaturated diesters and the like, as is disclosed in U.S. Pat. Nos. 2,340,110; 2,340,111; and 2,533,635. The disclosures of all of these U.S. Patents are hereby incorporated herein by reference for their discussion of carboxylic polymers and copolymers that, when used in polyacrylic acids, form yield stress materials as otherwise disclosed herein. Specific types of cross-linked polyacrylic acids include carbomer homopolymer, carbomer copolymer and carbomer interpolymer monographs in the U.S. Pharmocopia 23 NR 18, and Carbomer and C10-30 alkylacrylate crosspolymer, acrylates crosspolymers as described in PCPC International Cosmetic Ingredient Dictionary & Handbook, 12th Edition (2008).

Carbomer polymer dispersions are acidic with a pH of approximately 3. When neutralized to a pH of 6-10, the particles swell dramatically. The addition of salts to swelled Carbomer can reduce the particle size and strongly influence their rheological properties. Swelled Carbomers are nearly refractive index matched to solvents like water and ethanol, making them optically clear. The original synthetic powdered Carbomer was trademarked as Carbopol® and commercialized in 1958 by BF Goodrich (now known as Lubrizol), though Carbomers are commercially available in a multitude of different formulations.

Other exemplary materials include polysaccharides gels such as alginate and agarose, proteins gels such as fibrinogen, collagen, Matrigel®, synthetic polymer hydrogels such as poly(acrylamide), poly(ethylene glycol) diacrylate, poly (acrylic acid), and any other suitable material. The three-dimensional shape of these matrices may again be formed using temporarily phase changed material as the outer fluid and pre-gelled solutions with/without cells as the inner fluid. The pre-gelled material can be crosslinked using chemical or physical (heat, UV irradiation) treatment. Post gelation, the support material (now used as sacrificial material) may be washed away by diluting with salts and/or organic solvents and eventually immersed in aqueous culture media.

Figure 13:
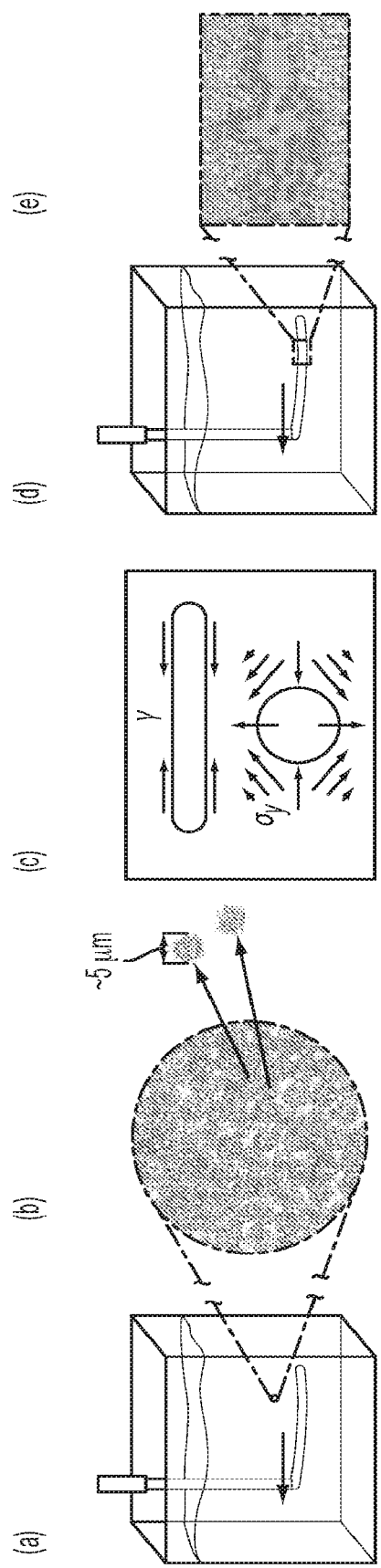
FIG. 13 illustrates cell structures extruded into yield stress materials for exemplary experimental study according to some embodiments.

Hydrogels may include packed microgels—microscopic gel particles, ~5 μm in diameter, made from crosslinked polymer (FIG. 13). The yield stress of Carbopol® is controlled by water content. Carbopol® yield stress can be varied between roughly 1-1000 Pa [41]. Thus, both materials can be tuned to span the stress levels that cells typically generate. As discussed above, while materials may have yield stresses in a range of 1-1000 Pa, in some embodiments it may be advantageous to use yield stress materials having yield stresses in a range of 1-100 Pa or 10-100 Pa. In addition, some such materials may have thixotropic times less than 2.5, less than 1.5 seconds, less than 1 second, or less than 0.5 seconds, and greater than 0.25 seconds or greater than 0.1 seconds, and/or thixotropic indexes less than 7, less than 6.5, or less than 5, and greater than 4, or greater than 2, or greater than 1.

Figure 7:
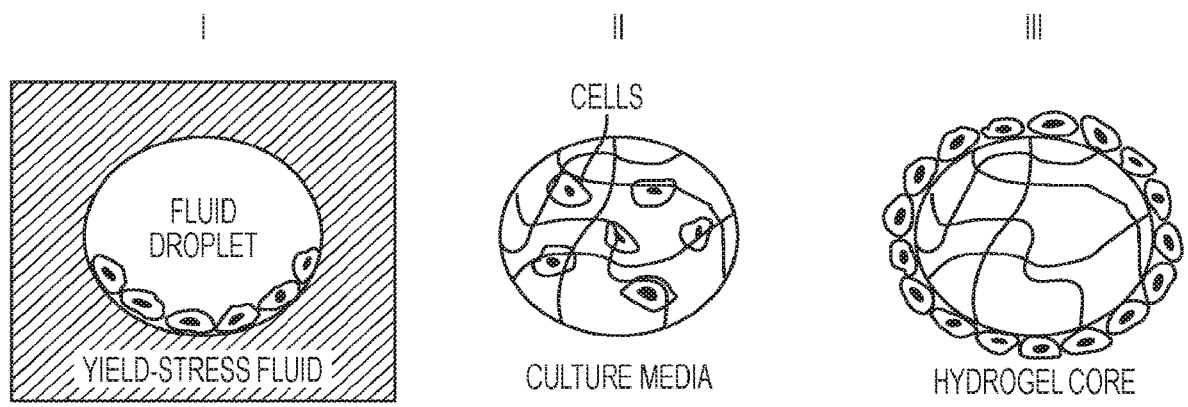
FIG. 7 illustrates schematics of three variations of a cell-matrix configuration that may be formed using techniques as described herein according to some embodiments.

According to some embodiments, the cells may be introduced during or after matrix formation, which may yield three distinctive types of cell assemblies, as shown in FIG. 7. According to some embodiments, a quick and simple, surfactant-free encapsulation may be provided. As described above, the inventors have recognized and appreciated the varied topology of structures that can be generated, including toroidal surfaces presenting regions of positive Gaussian curvature (as in spheres), regions of zero Gaussian curvature (as in 2D planes), and regions of negative Gaussian curvature (like those of a saddle). Alternatively or additionally, the mechanosensing of substrate curvature by cells may be determined. This determination may include fabrication of scaffolds with controlled geometries made of a selected matrix material, seeding cells on these substrates with different curvatures, and evaluating responses produced by the cells growing in contact with different substrates.

Figure 12A:
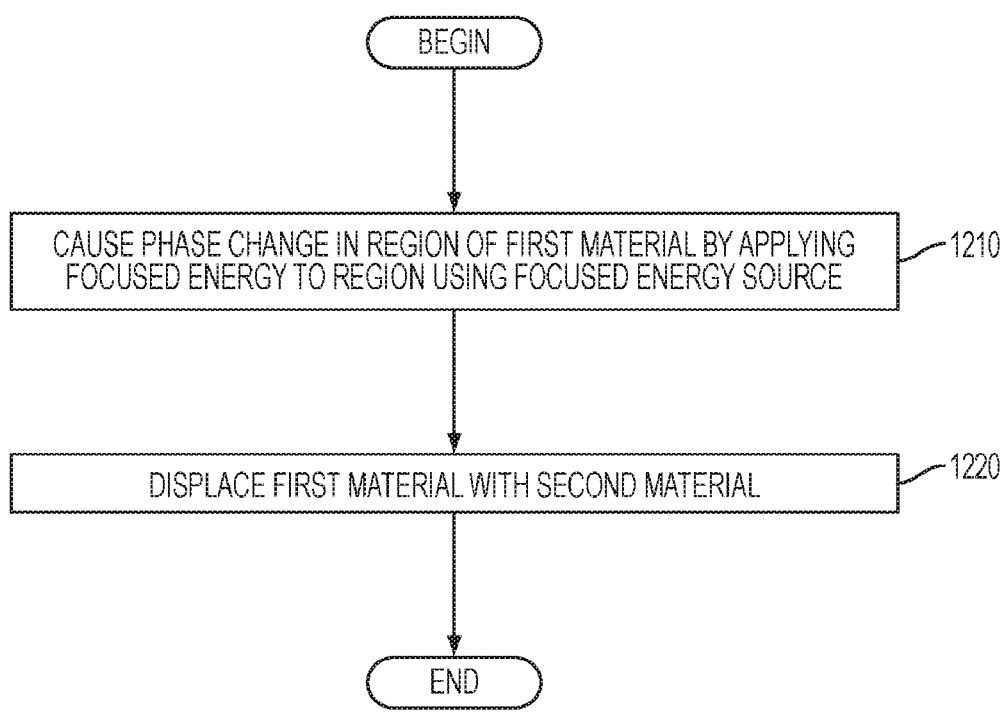
FIG. 12A is a flowchart of a method for three-dimensionally printing according to some embodiments.

It should be appreciated from the foregoing that some embodiments are directed to a method for three-dimensionally printing, as illustrated in FIG. 12A. The method begins at act 1210, at which a phase change may be caused in a region of a first material by applying focused energy to the region using a focused energy source. That material may be a material that may undergo a change from a less fluid to a more fluid state upon introduction of energy. The method then proceeds to act 1220, at which the first material may be displaced with a second material.

Figure 12B:
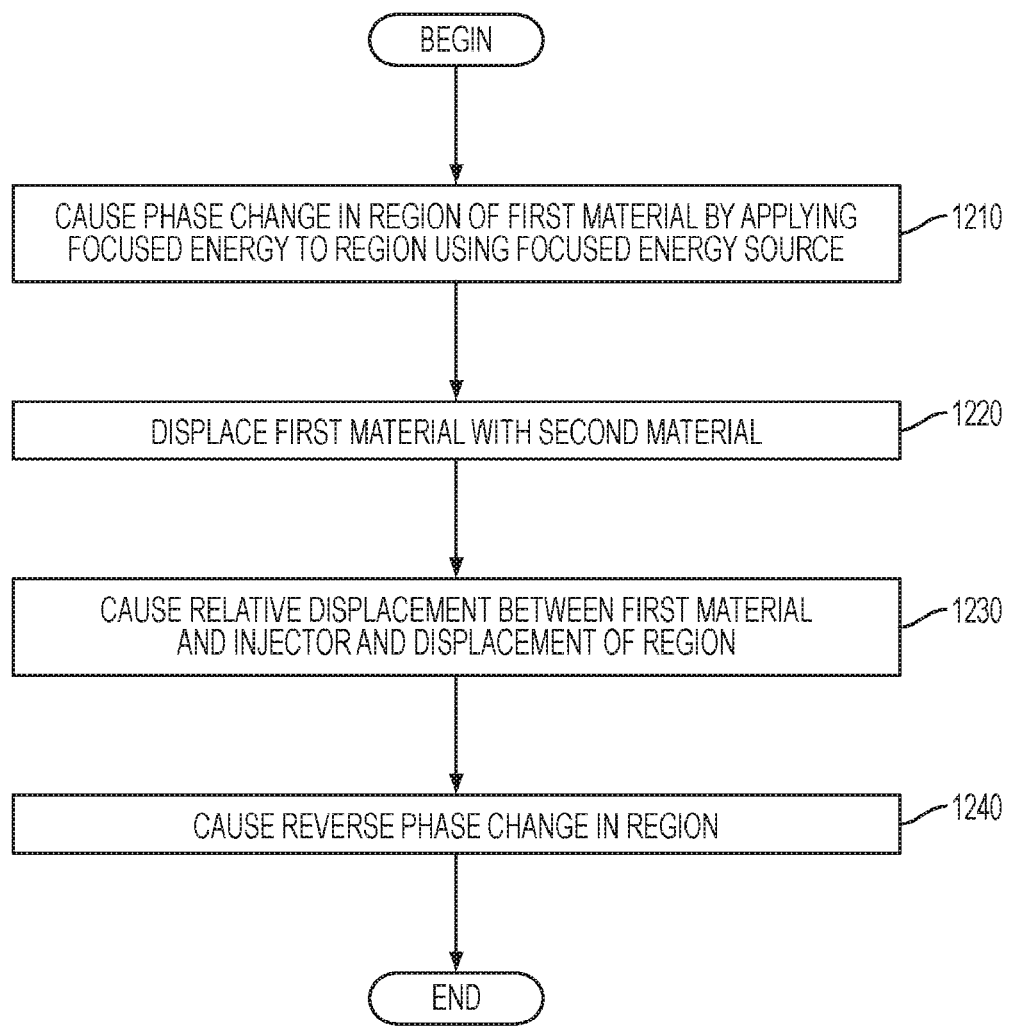
FIG. 12B is a flowchart of another method for three-dimensionally printing according to some embodiments.

It should be further appreciated from the foregoing that other embodiments are directed to a method for three-dimensionally printing, as illustrated in FIG. 12B. The method begins at act 1210, at which a phase change may be caused in a region of a first material by applying focused energy to the region using a focused energy source. The method then proceeds to act 1220, at which the first material may be displaced with a second material. The method then proceeds to act 1230, at which relative displacement between the first material and the injector and displacement of the region are caused. The method then proceeds to act 1240, at which a reverse phase change in the region is caused.

Exemplary Uses of Embodiments

Figure 8:
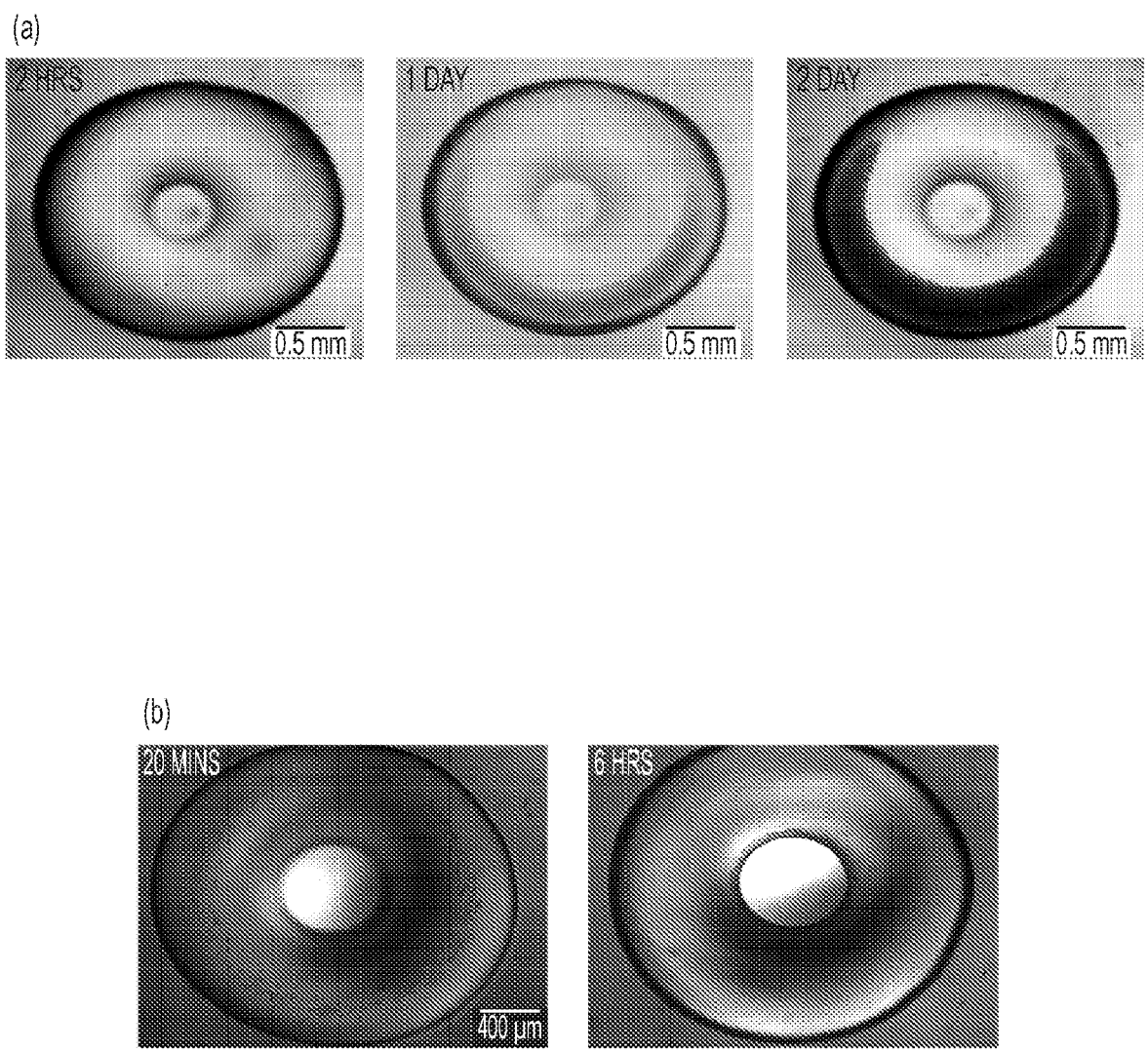
FIG. 8 illustrates examples of (a) yeast cells and (b) MDCK epithelial cells cultured in a toroidal droplet that may be formed using techniques as described herein according to some embodiments, where epithelial cells may migrate toward regions of negative Gaussian curvature, and non-motile yeast cells may divide and grow from positions where the population has initially sedimented.

FIG. 8 illustrates examples of (a) yeast cells and (b) MDCK epithelial cells cultured in a toroidal droplet according to some embodiments, where epithelial cells may migrate toward regions of negative Gaussian curvature, and non-motile yeast cells may divide and grow from positions where the population has initially sedimented.

Figure 9:
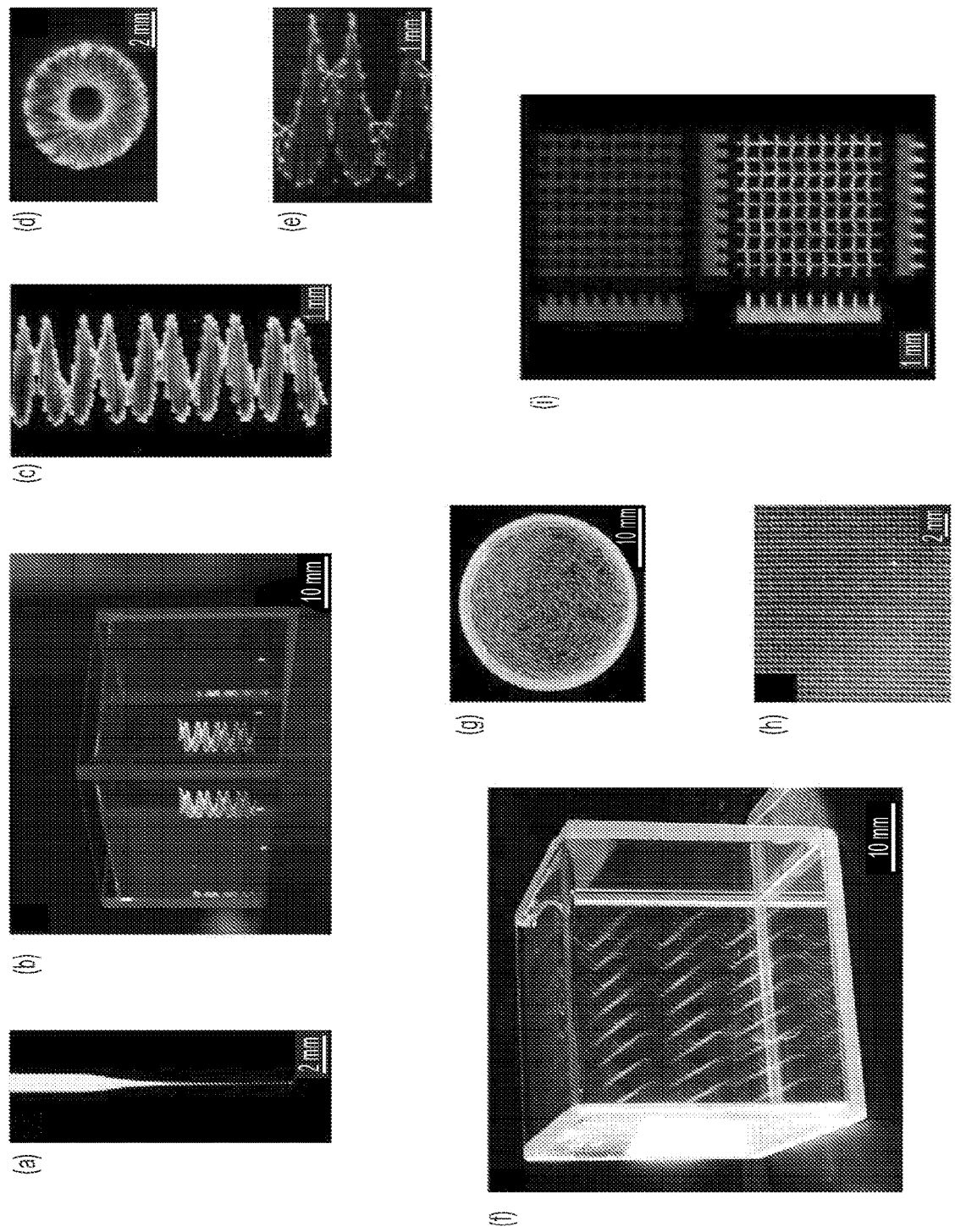
FIG. 9 illustrates surface tension minimization with water-water and oil-oil based 3D printing of structures that may be formed using techniques as described herein according to some embodiments.

FIG. 9 illustrates exemplary surface tension minimization with water-water and oil-oil based 3D printing. (a) A glass micropipette with a 100-micrometer diameter tip is used to draw 3D structures. The tip is filled with a fluorescent microsphere suspension and imaged under UV illumination. (b) A 3D structure resembling b-DNA is printed from an aqueous suspension of fluorescent microspheres in aqueous granular gel medium. This photo is taken with UV illumination. (c) A higher magnification image of the DNA-like structure shows the hair-thin "base-pairs" connecting each backbone of the two-start helix. (d,e) A top down view, and tilted side-view of the DNA structure show the fidelity of 3D writing and the extremely narrow separation between features. All DNA structures shown here are uncrosslinked spatial arrangements of microspheres. The uncrosslinked structures here show no signs of instability months after the drawing. (f) Vertical chiral rods arranged here in a 3D array hold their shape and orientation with no signs of gravitational effects. (g) The thin rods here are made from photocrosslinkable polymer; after gelation they are removed from the granular gel medium and placed in a petri-dish. The highly flexible rods bend around one another, exhibiting local orientational order. (h) PDMS-PDMS systems may allow the creation of an oil-based mesh with approximately 200-micrometer feature size that may be stable without crosslinking. (i) A maximum intensity projection from confocal microscopy z-stacks of PDMS mesh (top) and PVA mesh (bottom) show that uncrosslinked polymer structures may be stabilized by the granular gel medium. The logarithm of intensity is shown in (c,d,e) using false-color LUTs to make the thin, faint features visible.

Figure 10:
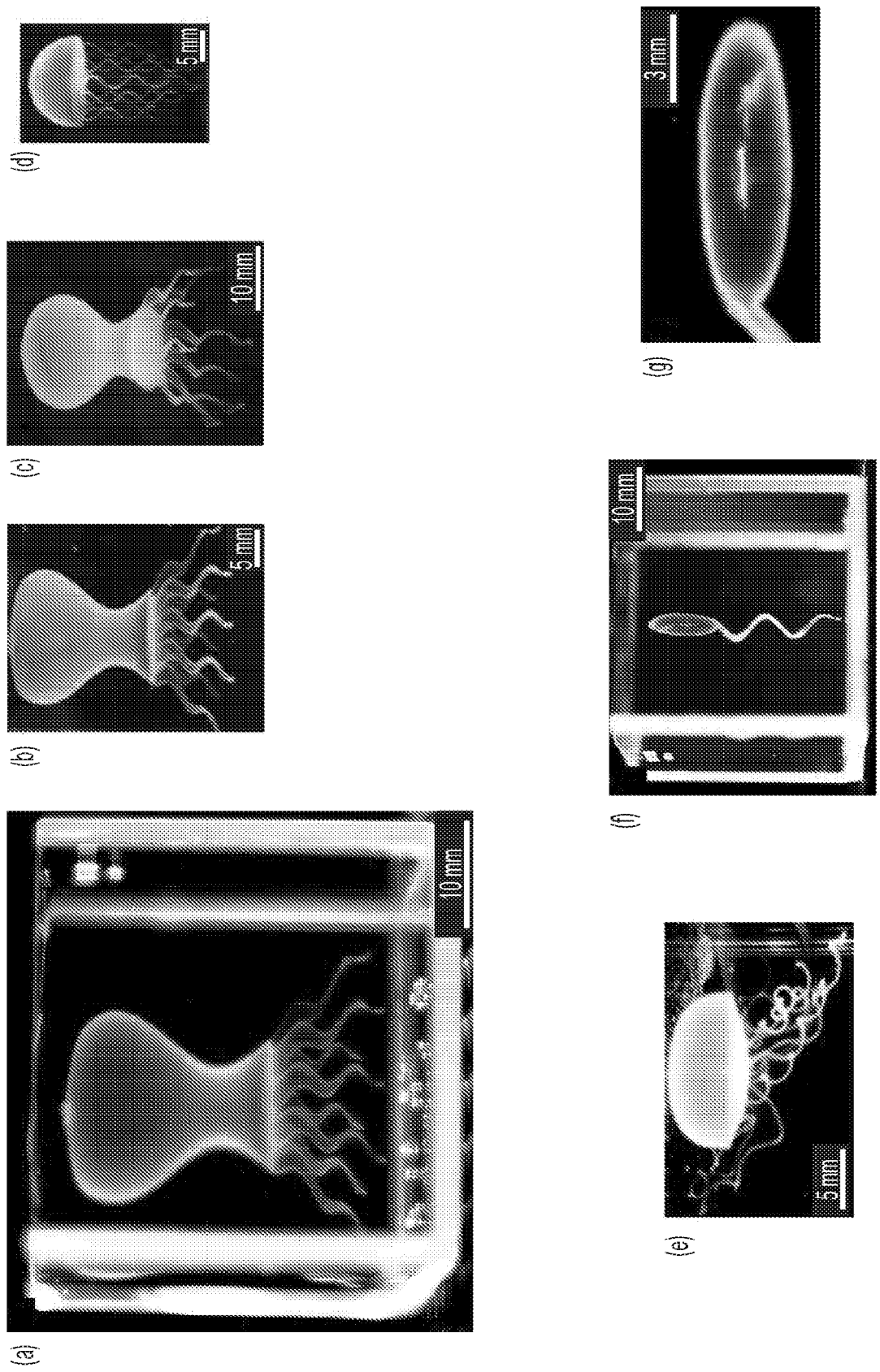
FIG. 10 illustrates a 3D drawing of complex, soft, and robust structures that may be formed using techniques as described herein according to some embodiments.

FIG. 10 illustrates exemplary 3D drawings of complex, soft, and robust structures. (a) A thin-shell model octopus is made from multiple connected hollow hydrogel parts with complex, stable surface curvature. This bright field photograph is taken before polymerization. (b) A fluorescence image of the octopus model after polymerization, still trapped in granular gel medium, exhibits no structural changes from the polymerization process. (c) The polymerized octopus model retains integrity after removal from the granular gel medium, shown freely floating in water. (d) A model jellyfish incorporates flexible high aspect ratio tentacles attached to a closed-shell body. (e) A freely floating jellyfish model, photographed in water, demonstrates robustness and flexibility. (f,g) A model spermatozoon demonstrates the ability to encapsulate material. Printing was paused, fluorescent particles were injected manually, and programmed printing was completed. The photographs in (a,c,e,f,g) were taken under white-light illumination. The photographs in (b,c) were taken under UV illumination and are shown with false-color LUT to enhance weak features. The printed material in (a-e) is a mixture of photocrosslinkable PVA and fluorescent microspheres.

Figure 11:
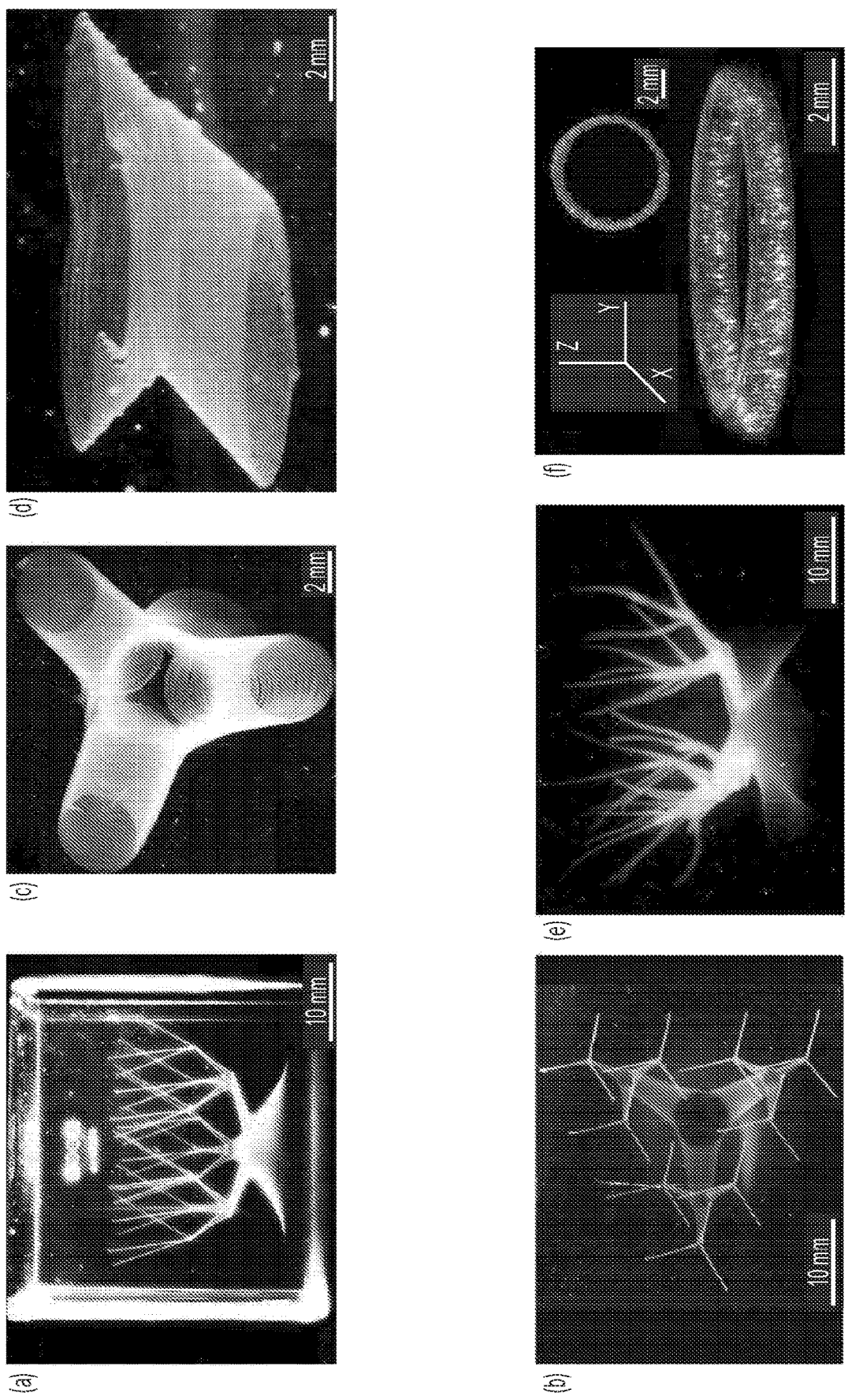
FIG. 11 illustrates hierarchical 3D vascular networks with variable aspect ratio that may be formed using techniques as described herein according to some embodiments.

FIG. 11 illustrates exemplary hierarchical 3D vascular networks with variable aspect ratio. (a) A continuous network of hollow vessels is generated in which a large vessel branches to three smaller vessels, each branching to even smaller vessels, and so on, resulting in a single vascular network with features spanning about three orders of magnitude in size and many orders of magnitude in aspect ratio. A mixture of photocrosslinkable PVA and fluorescent microspheres is used for writing the structure. (b) The same network in (a) is shown from the top. (c) A high resolution photo of truncated vessels around a single junction show that the features are hollow with extremely thin walls. Single traces of the printed material can be seen, which have a diameter of approximately 100 micrometers. (d) The same junction from (c) is shown from the side without the top three vessels, demonstrating that concave and convex curvatures can be created in single stable structures. (e) The 3D vascular network is crosslinked, removed from the granular gel medium, and photographed while freely floating in water. (f) This entire vascular network was also created from human aortic endothelial cells (HAECs), written into granular gel medium permeated with cell growth media. However, the dielectric constant of the resulting structure is so close to the granular gel medium, and the features are so fine, the resulting structure cannot be seen in photographs. However, with fluorescently labeled cells, a portion of the structure may be measured using confocal fluorescence microscopy. The tilted tubular structure that forms the base in (d) can be seen, here made from fluorescently labelled HAECs. The image is a maximum intensity projection along a skewed direction, and the inset is the XY slice corresponding to the top of the tubular structure. The inventors have monitored cells in printed structures over the course of several weeks, finding no signs of toxicity.

Exemplary Experimental Study Using Some Embodiments

Overview

A new class of biomaterial may enable study of tissue cell dynamics: structured 3D cell assemblies in yield stress materials. One of the unique features of the 3D cell assemblies described herein is the substrate in which they are embedded: yield stress materials. The interplay of yield stress, interfacial tension, and cytoskeletal tension may generate new instabilities analogous to those of classical solids and fluids. Yield stress materials may be applied to these studies because (1) their properties allow for unprecedented versatility of cell assembly design, (2) they are homogeneous and transparent, enabling high quality imaging and tractable modeling, and (3) their use with cell assemblies represents the creation of a new class of biomaterial.

Mechanical instabilities in simple structures may be used to classify and measure collective cell forces. The hallmarks of instabilities reveal underlying forces, and to study instabilities is to study the interplay of dominating forces. For example, radial oscillations in fluid jets are the hallmark of the Rayleigh-Plateau instability; measuring these fluctuations probes the interplay of surface tension, viscous stress, and inertia. For cell-assemblies embedded in a support material, the emergent, dominating forces are not known. Simple cell structures may be created in yield stress materials, allowing for investigation of unstable behavior and the hallmarks of classic instabilities. The breadth of structures accessible with the methods described herein may be tested. Stresses may be measured optically by dispersing fluorescent markers in the yield stress material. The threshold of structure stability may be studied by tuning the yield stress of the embedding medium.

The symmetry and topology of complex multicellular structures may have a role in collective cell dynamics. Observations of cells in toroid structures have led us to a guiding discovery: topology can be used for load bearing. The inventors have investigated collective cell dynamics in single loop structures (topological genus=1), and in large arrays of loops (genus>1). The stability of loops depends on the yield stress of the material and cytoskeletal tension, which can be manipulated in many ways. Symmetry of loop arrays may control collective motion; if vorticity develops around each loop, even transiently, loop-loop interactions may arise. The inventors have looked for an anti-ferromagnetic phase in square vortex lattices; spin-glass phases may appear in hexagonal vortex lattices. Stability and correlation are compared between 1D, 2D, and 3D lattices.

In summary, yield stress materials have never been harnessed to create controlled, complex 3D cell structures. The first activities employing this new bio-material may uncover new kinds of mechanical instability arising from the combination of living, self-driven cells with a complex material that is studied elsewhere for its own exciting properties [1-6]. This unique combination enables the creation of large, multicellular lattices with which fundamental questions about the roles of symmetry and topology in collective cell behavior can be explored for the first time.

Approach

The current paradigm in cellular biomaterials research is to create a solid scaffold and demonstrate its biocompatibility in vitro or in vivo. The properties of extant scaffold systems prohibit versatile experimentation of cell dynamics, limiting investigations of scaffold interactions with living cells. The characteristic shared by these scaffold systems: they are solid. Creating well controlled 3D cell assemblies of arbitrary design in solid scaffolds may not be possible. One question is how one can create a 3D cell manifold inside of a solid scaffold without damaging the scaffold. The use of the yield stress cellular biomaterial is significant because it may (1) create a superior platform for carrying out fundamental investigations of 3D cell dynamics; (2) create a new class of biomaterial never before investigated; and (3) explore fundamental aspects of collective cell dynamics previously prohibited from study, limited by available support materials. These activities are founded on a new concept that breaks with the established paradigm in cellular biomaterials.

Yield stress materials may meet requirements of cellular biomaterials research, such as (1) control of cell aggregate size and shape; (2) measurement of cell generated force; and (3) optical imaging. Yield stress materials (YSMs) are solids when applied stress is below the yield stress, $\sigma_y$. At stresses exceeding $\sigma_y$, YSMs fluidize. When the applied stress falls below $\sigma_y$, a fluidized YSM solidifies again. These properties enable the generation of countless multi-cellular structures by extruding cells or cell/ECM mixtures into YSMs. As the cells are extruded, the nozzle fluidizes the YSM, and when the structure is complete, the extruding nozzle can be removed from the YSM, leaving behind homogeneous support material.

One of the YSMs that may be used is Carbopol®, a commercially available material that has been extensively studied [41, 42]. Carbopol® is popular in the study of YSMs because, once yielded, it does not shear thin as strain rate rises, making it "ideal" [4]. MRI velocimetry on Carbopol® samples showed that the local strain is the same as the bulk strain across the yielding threshold [6]; this is noteworthy because it demonstrates Carbopol's® homogeneity, raising the possibility of developing a 3D force microscopy method.

Studies

The inventors have performed studies using two materials: Carbopol ETD 2020 and Dow-Corning 9041 Silicone Elastomer Blend. The Carbopol is aqueous and the DC-9041 is silicone oil based. Both consist of packed microgels—microscopic gel particles, ~5 μm in diameter, made from crosslinked polymer (FIG. 13). The yield stress of DC-9041 is controlled by adding or removing PDMS oil; the yield stress of Carbopol is controlled by water content. Carbopol yield stress can be varied between roughly 1-1000 Pa [41]; the inventors' tests of DC-9041 reveal a similar range. Thus, both materials can be tuned to span the stress levels that cells typically generate.

Instrument Construction

Figure 14:
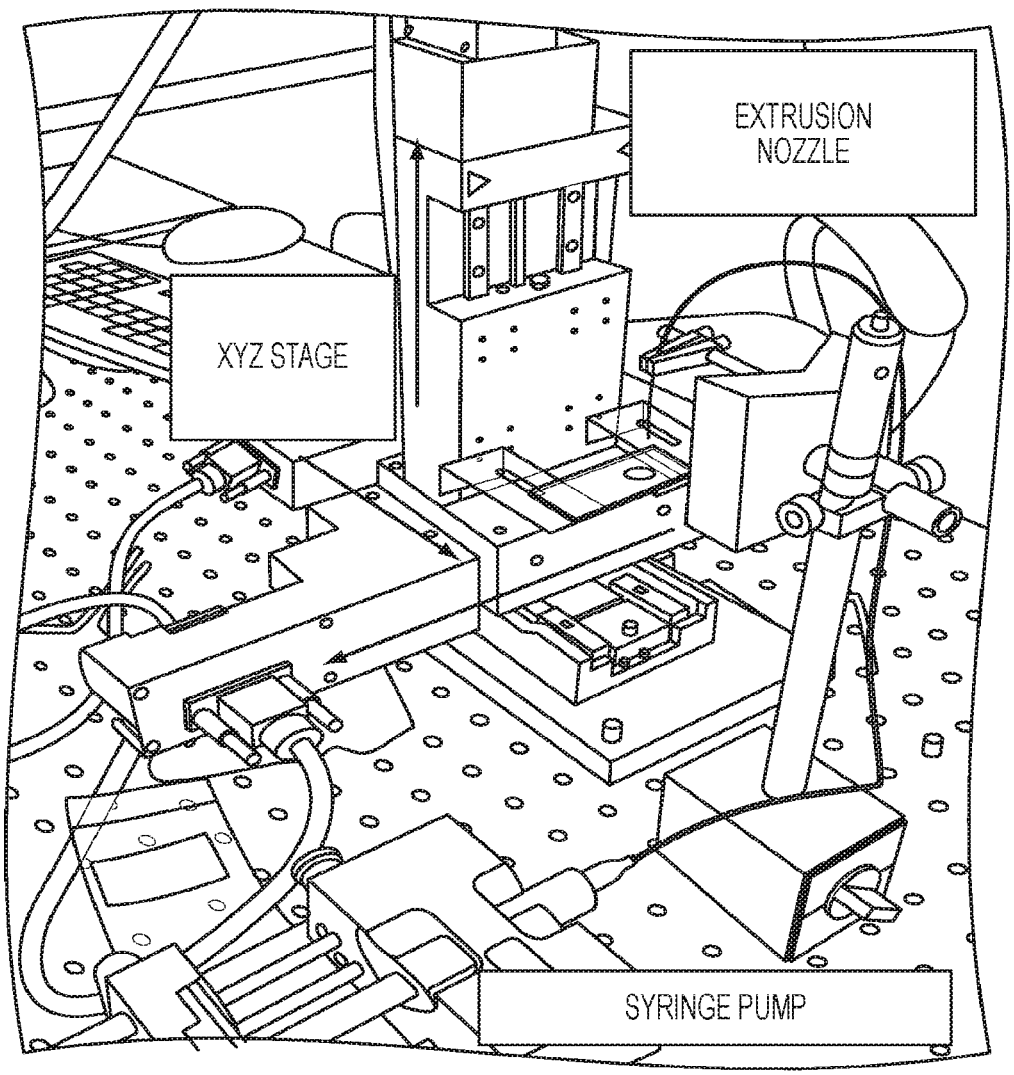
FIG. 14 illustrates a 3D extrusion system for exemplary experimental study according to some embodiments.

The 3D extrusion system may comprise an XYZ stage constructed from three linear translation stages (M-403, Physik Instrumente) driven by Mercury DC motor controllers (C-863, Physik Instrumente). The extrusion system is a computer-controlled syringe pump (Next Advance), held stationary to enable imaging as the stage moves, translating the yield stress support material in 3D (FIG. 14). The extrusion nozzles may be home made from glass pipettes, pulled with a Kopf-750 micropipette puller and shaped with a Narishige micro-forge. The inventors have control over nozzle diameter and shape; nozzle wettability is varied with hydrophilic 3-aminopropyl-triethoxysilane, or hydrophobic octadecyltriethoxysiloxane.

Example: Tests of Carbopol®: Aqueous-Aqueous Structures

Figure 15:
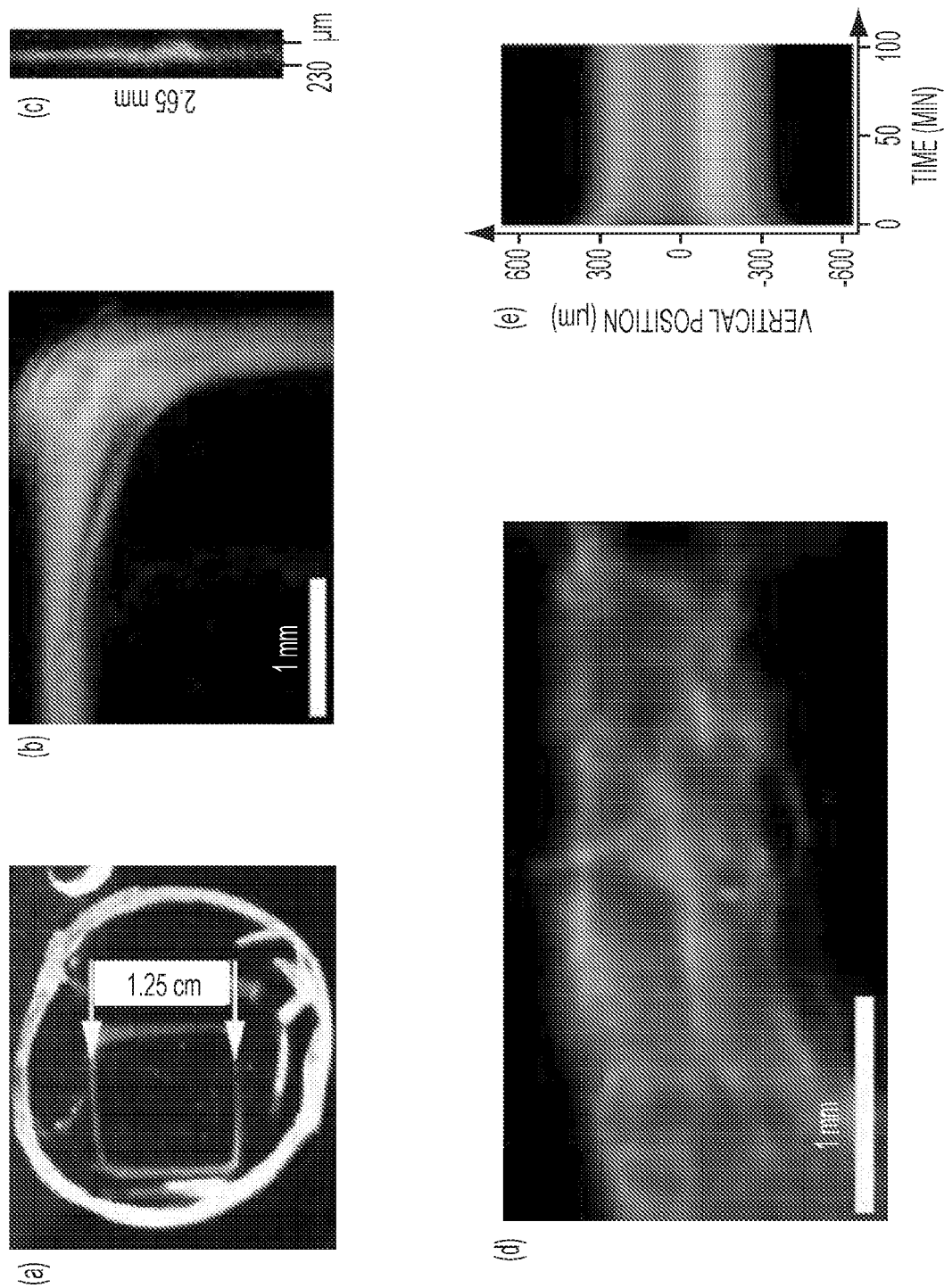
FIG. 15 illustrates extruded structures for exemplary experimental study according to some embodiments.

Cells live in aqueous media and Carbopol® is aqueous. With the 3D extrusion instrument described herein, the inventors have injected water suspended blue pigment particles (d~1 μm) into Carbopol®, creating a continuous square-shaped structure with sub-millimeter cross section. The structure showed no long-term instability over several days. To study the relaxation of structures, the inventors manually injected an aqueous suspension of fluorospheres (d=5 μm) into Carbopol® at a high flow rate, and imaged part of the structure in time-lapse. The high pressure and flow rate appeared to fracture the Carbopol® phase, creating micro-scale channels, but the injected region relaxed marginally and remained stable (FIG. 15). FIG. 15 illustrates: A square outline of particles was extruded (A) with an average cross section of <500 μm (B). A stable linear structure of diameter ~200 mm was generated (C). Manual injection of fluro-spheres created a "fracked" structure (D) that relaxed briefly then stabilized (E). Similar cell structures should remain stable, apart from the influence of cell-generated forces. For many days of cell growth in Carbopol®, the polymer particles must be swelled in cell growth medium. The inventors have made a Carbopol®-cell growth medium mix in which the inventors have grown human aortic endothelial cells for days with no signs of cell death.

Example: Tests of DC-9041: Aqueous-Oil Structures

Figure 16:
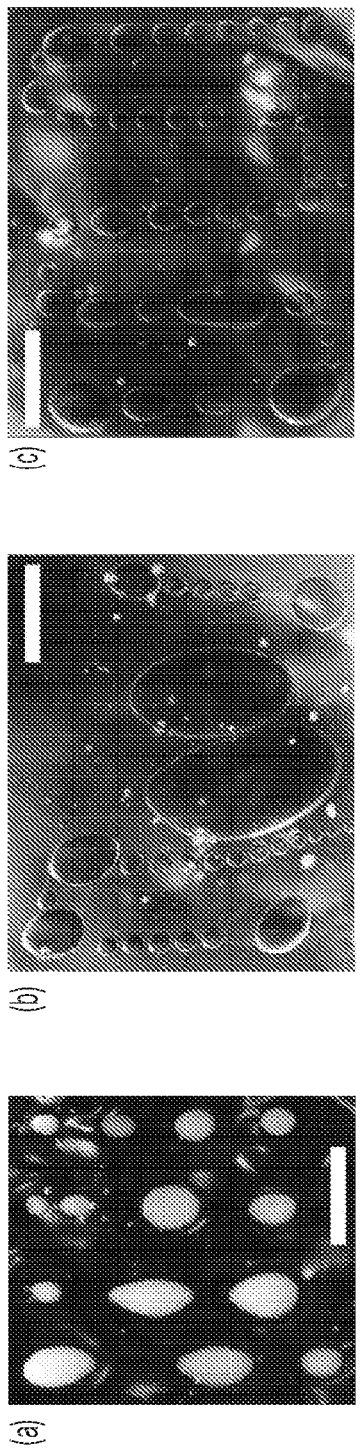
FIG. 16 illustrates droplets extruded into yield stress materials for exemplary experimental study according to some embodiments.

The immiscibility of the cell phase and DC-9041 introduces a significant force: interfacial tension, γ. The extrusion rate, extruder speed, viscosity of fluidized DC-9041, yield stress of solid DC-9041, and γ, all determine the shape and stability of the extruded structure. When the yield stress, $\sigma_y$, is too low, lines cannot be formed; the balance of $\gamma$ and $\sigma_y$ causes large droplets to remain irregularly shaped while small droplets become spherical. When $\sigma_y$ is large, and the extrusion rate and extruder speed are high, narrow lines can be formed (d<300 μm). Intersections of narrow lines are stable, and fine features can be extruded with separation distances as small as the stable feature size. Tests using cell growth medium perform better than aqueous suspensions of dye or particles (FIG. 16). FIG. 16 illustrates: (A) Small, linear features are unstable in low-yield stress DC-9041; surface tension drives small drops to spherical shapes; large drops remain elongated. (B,C) At intermediate yield stresses smaller drops are generated and intermediate sized drops remain elongated. (D) At high yield stresses, perfect crossed lines are generated with diameters of ~250 μm. (E) At high yields stresses, two right angles can be drawn stably with a separation distance of <100 μm at the corners. Scalebars: 3 mm.

Example: Tests of Cells in DC-9041

Figure 17:
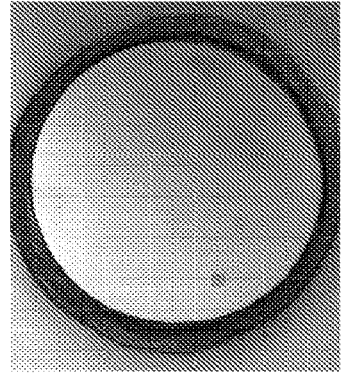
FIG. 17 illustrates cell interaction with extruded droplets for exemplary experimental study according to some embodiments.
Figure 17:
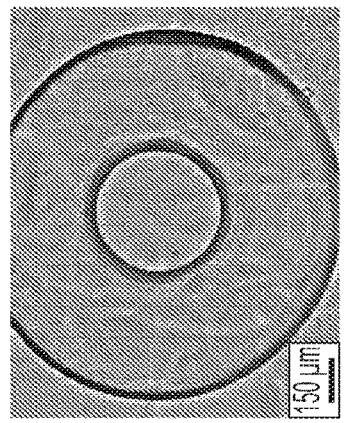
Figure 17:
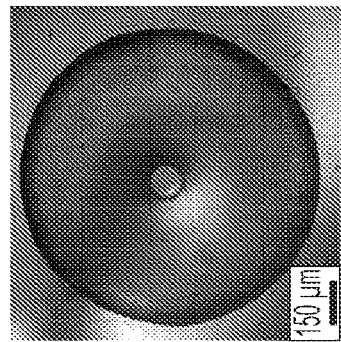
Figure 17:
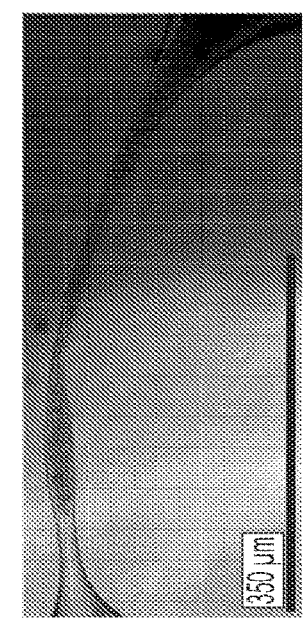
Figure 17:
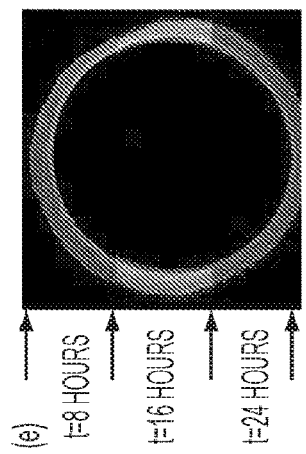
Figure 17:
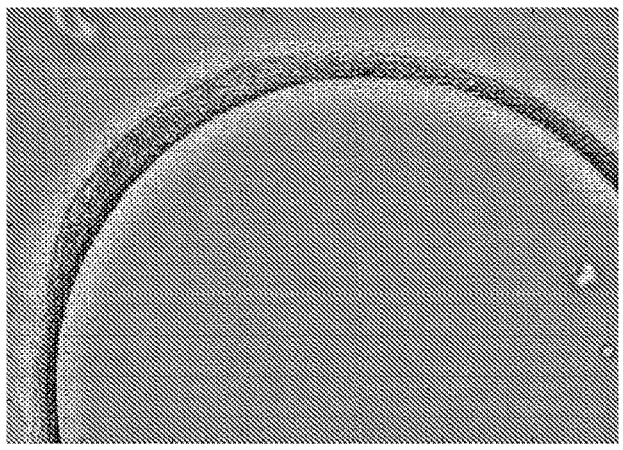

Toroid structures containing MDCK epithelial cells were extruded into the DC-9041 at low densities. Cells settled to the bottom of the toroid and appeared to form a continuous band through cell-cell cohesion, contracting inward and squeezing the inner surface. Cells appeared to take on a spread-out, contractile-like morphology similar to cells on surfaces optimized for cell culture. Over time, the inner radius of the toroid decreased. The decrease in radius may be generated by collective cell tension originating in cytoskeletal contraction. Asymmetric collapse of a toroid squeezed the cell band into a narrow tube; this type of failure may be driven by cytoskeleton tension. Performing digital image correlation (PIV) on the time-lapse movies revealed significant equatorial collective motion, suggesting that a net vorticity emerges in this circular geometry (FIG. 17). FIG. 17 illustrates: (A) Sparse cells settle to the bottom surface of a toroidal drop. (B) In the absence of matrix, cells cohere forming a band and contracting around the inner surface. (C) A high magnification image of cells in panel B. (D) A toroidal shape created in a low yield stress material collapses asymmetrically, squeezing a group of cells down to ~30 μm cross section. (E) In a stable toroid from panels B and C, cells contract the inner surface over time. (F) PIV on cells from panels B, C, and E shows a net vorticity.

Exemplary Application

Range of Possible Structures

To facilitate efficient studies of complex structures, a wide range of simple structures may be created, like linear and curved tubes. The relationship between tube diameter and extrusion rate may be experimentally determined, creating a data "recipe book" to guide later studies of complex structures. To harness the versatility of yield stress materials, the limits of structural stability may be found in materials over a wide range of yield stresses. Yield stress is varied by dilution with water for Carbopol®, and with PDMS oil for DC-9041. Tuning the yield stress may be crucial for the quantitative studies of cell forces, below. Stress propagation is sensitive to the size and speed of the extrusion nozzle, which may be varied to maximize the range of possible structures.

Fluorescent Markers for Direct Observation of Motion

Figure 18:
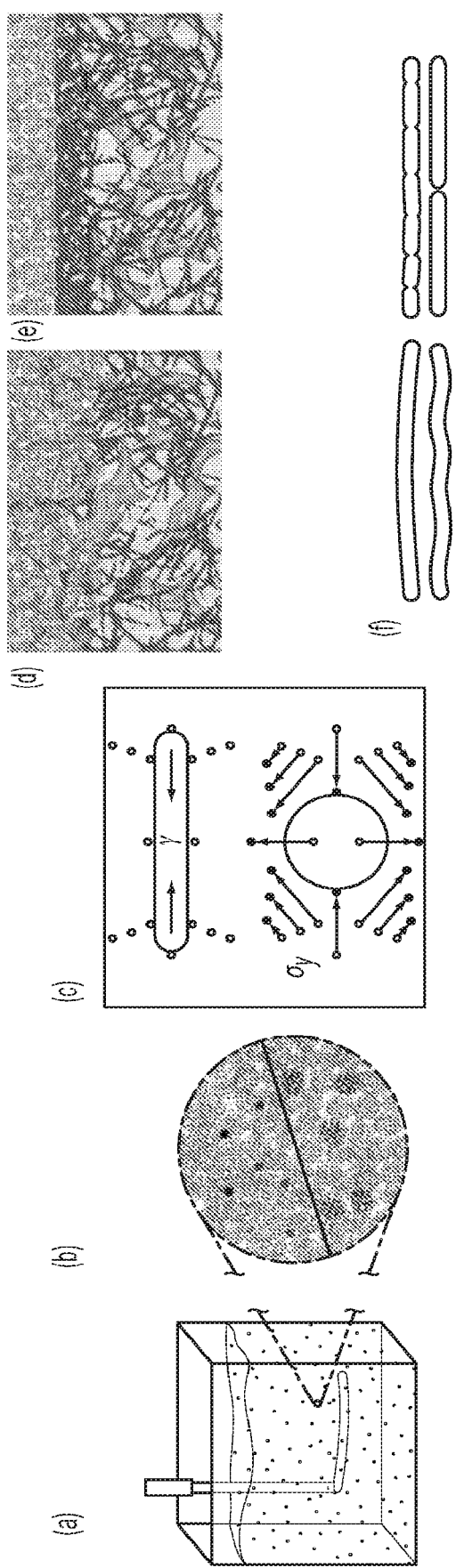
FIG. 18 illustrates stress computation techniques for exemplary experimental study according to some embodiments.

As unstable structures collapse, and stable structures generate or relax stress, the surrounding yield stress material may displace. Markers may be dispersed throughout the yield stress materials to enable measurement of local displacements. In Carbopol®, fluorescent beads may be mixed in with the microgel particles; large beads (~1 μm) may be trapped between microgels. Alternatively, if smaller beads are required, or bead diffusion occurs, the microgels may be swelled in a strong base (NaOH), allowing fluorescent nanoparticles (~10 nm) to diffuse into the polymer mesh, and then returning the system to neutral pH, shrinking the gels and trapping the nanoparticles. Similar approaches may be taken with DC-9041 fluid. The inventors have dispersed aqueous fluorospheres in PDMS, with a step-wise solvent exchange from water to ethanol to methanol. Beads suspended in methanol can be extremely well dispersed in viscous PDMS fluids by sonication with a high-powered probe sonicator. If swelling the DC-9041 micro-gels is necessary to trap particles in the polymer mesh, hexane may be used as a swelling agent, and PMMA nano-particles may be used because of their stability in hexane. 3D tracking of fluorescent particles may be performed with confocal microscopy to measure displacements; with sufficient data, strain fields can be computed. The material properties of the yield stress materials described herein with bulk rheology may be studied, and the known bulk rheological properties of the yield stress materials may be used to compute stresses (FIG. 18A-C). FIG. 18A-C illustrate: (A,B) To develop optical force measuring methods, fluorescent markers are embedded in the YSMs. (C) As cell structures move, the surrounding YSM are strained. If the material properties of the YSM are known in detail, strains may be converted to stresses in well-defined cases.

Cell/Support Interface in Simple Structures

The inventors' data show the compatibility of Carbopol® and DC-9041 with cultured cells. The surprising "fracking" behavior of Carbopol® during extrusion suggests that when mixtures of cells and collagen precursor are used, the collagen matrix may interdigitate with open channels near the Carbopol® surface, creating entanglements (FIG. 18D). FIG. 18D illustrates how cell/ECM structures formed in Carbopol® may have entanglements at the interface. By contrast, the immiscibility between the cell growth mixture and DC-9041 fluid may create smooth surfaces due to interfacial tension. Collagen precursor may adhere to this interface, forming connections to the bulk matrix; non-specific adhesion of collagen to PDMS is routinely used for cell adhesion on flat surfaces (FIG. 18E). FIG. 18E illustrates how cell/ECM structures formed in DC-9041 may have smooth interfaces. In both cases, the total adhesion energy may scale with surface area, yet the total energy cells generate with contractile stress scales with volume, and possibly cell density. Therefore, the adhesion and detachment of cell-matrix assemblies may be studied, as a function of volume and cell density, in simple structures like spheres and cylinders. Cell contraction may also be manipulated using drugs like blebbistatin and thrombin. By carrying out time-lapse measurements over long times the effects of cell-density can be determined; cell density steadily increases over time due to proliferation. The collagen network can be imaged using confocal-reflectance or by fluorescently labeling collagen with rhodamine, using EDC-NHS chemistry. Cells can be identified using whole-cell dyes (CMFDA), nuclear stains (Hoechst), or transfection approaches.

Yield Stress and Cell Forces

The several energy scales in the cell/support system can compete to give rise to unique instabilities. In a slender cylinder, if cells align axially, cell generated tension may take the place of external forces in classic Euler buckling, causing a long-wavelength bend. If the support material lends lateral reinforcement, a short-wavelength buckle may arise; the wavelength may be controlled by the modulus of the support material and the bending elasticity of the cell-collagen cylinder. If one of these modes arises at low stresses, but cell generated stress rises above the yield stress (~⅓ of the shear modulus), the growth of one of these ground-state modes may grow uncontrollably, or the instability may vanish because the support material is no longer solid. Alternatively, if cells generate shear stress gradients in the cylinder, and the yield stress material fluidizes, interfacial oscillations may arise analogous to those of the Rayleigh-Plateau instability. Growth of Rayleigh-Plateau-like modes could cause tube-break up, determining a maximum length-scale for stable structures, set by cell generated stress and interfacial tension between the two phases (FIG. 18F). FIG. 18F illustrates how, depending on the dominating forces in the structures, several types of instabilities may arise. To explore these cell-generated instabilities, linear structures with a range of diameters and lengths may be created, supported in both types of yield stress material, prepared with a wide range of yield stresses. If the instability can be categorized, the type of emergent force can be determined (surface tension, shear stress, etc). In the ideal case, a single, unknown, cell-generated force is competing with a known force in the passive material, enabling a measurement of the cell-generated force.

Collective Cell Dynamics with Topological Constraints

Figure 19:
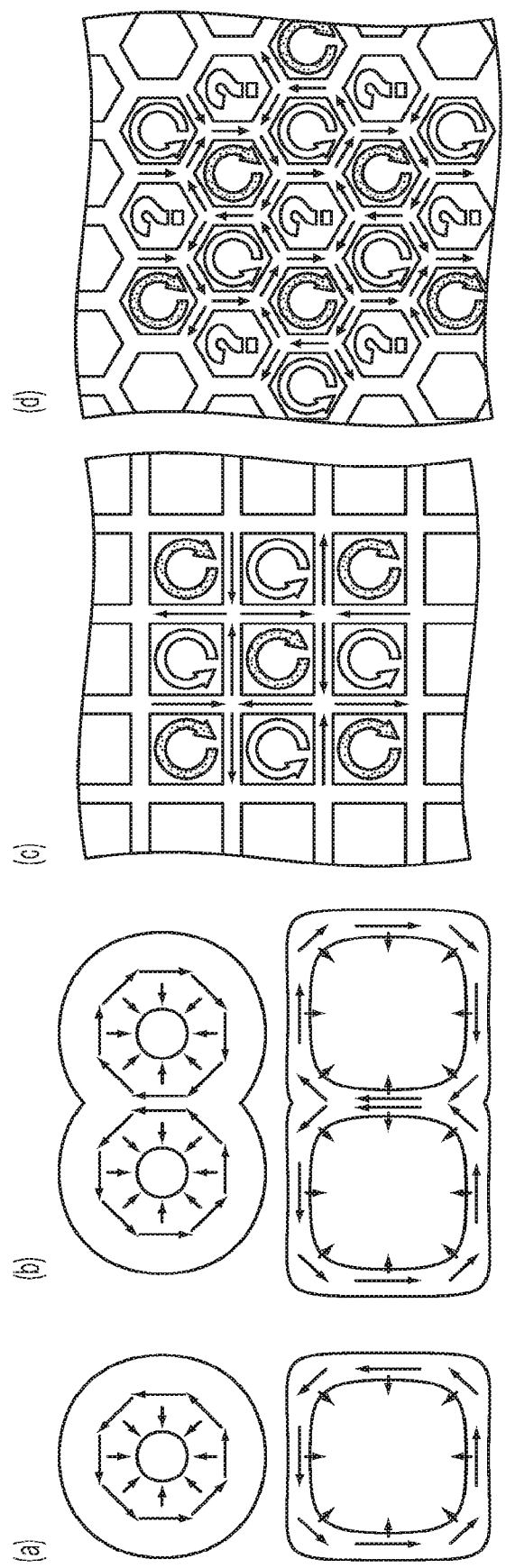
FIG. 19 illustrates cell interaction with various curvatures for exemplary experimental study according to some embodiments.

The inventors' data demonstrated the importance of topology: in a genus=1 object, cells form a large, stable unit with no ECM, and migrate collectively. These studies may be continued in circular and square volumes to explore many questions (FIG. 19A). FIG. 19A illustrates how cells circulate in genus=1 structures, and cells migrate toward surfaces of preferred mean or Gaussian curvature. Structure size may be varied to explore the relationship between cell-generated forces and curvature; tension can be estimated by measuring contraction of the inner surface. The volumes may be filled with ECM so that cells can migrate to all surfaces, testing whether cells prefer specific combinations of mean and Gaussian curvature that exist in loop structures. Different cell types may be compared, like epithelial, endothelial, and fibroblast cells to explore the relationship between cells from different tissues and different types of curvature. Cells may be sensitive to topology and mean or Gaussian curvature, providing a new class of cell guidance for many applications.

Vorticity in Loops

The large-scale correlation length observed in measurements of collective cell motion in toroids, and the apparent vorticity, raise a question of whether the size of the loop can control a transition between collective circulation and random motion. Collective migration may be explored in loop structures of varying size to search for such a transition. Small loops may circulate, and when the circumference of a loop exceeds a natural correlation length, controlled by individual cell dynamics, random motion may occur. Controlled collective circulation may be used to study pairs of loops to look for coordination over larger scales (FIG. 19B). FIG. 19B illustrates how cooperative circulation arises in pairs of loops, coupled by shear stress. Neighboring loops may coordinate in opposite directions, minimizing shear-stress at the interface. These studies may be performed in loops without ECM and in loops filled with ECM. Curvature may confound the effect; smaller loops may promote collective circulation, but their high curvature may inhibit migration.

A Lattice to Tile Space and Collective Migration Patterns

Coordinating cell migration in proximal loops, even weakly, may allow repeating the pattern on a large lattice to amplify coordination, analogous to size-dependent effects in magnetism. Analogies between collective cell migration and collective effects in magnetic spin systems may be explored by creating multi-cellular lattices of varying size and symmetry. Coordinated cell vortices may be analogous to anti-ferromagnetic spins; neighboring cell vortices may rotate in opposite directions, coupled by shear stress. Arranging cells on a lattice with square symmetry may generate an anti-ferromagnetic phase; all of space can be tiled by counter-rotating vortices. By contrast, by arranging cells on a lattice with hexagonal symmetry (technically a honeycomb lattice in this case), geometric frustration may suppress macroscopic coordination of rotating vortices. The hexagonal phase may be analogous to a spin glass. Shear stress coupling may not be the only potential driving force for these phases; cell flux through nodes may be very different on the two lattices. On a square lattice each node may have two inputs and two outputs; on a hexagonal lattice each node may have either one input and two outputs, or vice-versa (FIG. 19C,D). FIG. 19C,D illustrates: (C) Cells on a square lattice form an anti-ferromagnetic phase. (D) Cells on a hexagonal (honeycomb) lattice form a spin-glass. Arrows indicate cell migration direction. Yellow arrows indicate cooperative paths; red arrows indicate frustrated paths. The use of symmetry as a principle to control collective motion may represent a new class of cell guidance.

Dimensionality in Collective Phase Stability

In both equilibrium and non-equilibrium systems, like the cell structures described herein, the degree of ordering, determined by competition between random fluctuations and the forces that promote order, may depend on the system dimensionality. To explore the dependence of order on system dimension, 1D, 2D, and 3D lattices may be created with identical features and compare spatio-temporal correlations in cell migration between the three. True long-range order may not be present in any system, however, 2D order may be longer ranged than 1D order, in analogy to the Ladau-Pierls instability. Additionally, there may be a major difference between the anti-ferromagnet and cell-vorticity coordination in 3D. All of space can be tiled with anti-parallel spins on a cubic lattice because all spins can align along a single axis. By contrast, the "spin" direction in a rotating vortex on a cubic lattice is normal to the face of the cube on which it sits. It may be impossible to tile all of space with these spins, and 3D geometric frustration may occur.

Issues and Alternative Approaches

Insufficient adhesion between cell structures and the YSM may result in delamination at the interface. This can be mitigated by chemical modification of the YSM material; Carbopol® is an acrylate based polymer, and covalent attachment of proteins is straight-forward. Alternatively, the collapse of a variety of delaminated structures may provide equally valuable insight into collective cell behavior in complex structures.

REFERENCES

The following references are incorporated herein by reference in their entireties:

1. Dimitriou, C. J., R. H. Ewoldt, and G. H. McKinley, *Describing and prescribing the constitutive response of yield stress fluids using large amplitude oscillatory shear stress (LAOStress)*. Journal of Rheology, 2013. 57: p. 27.

2. Menut, P., S. Seiffert, J. Sprakel, and D. A. Weitz, *Does size matter? Elasticity of compressed suspensions of colloidal-and granular-scale microgels*. Soft matter, 2012. 8(1): p. 156-164.

3. Moller, P., A. Fall, V. Chikkadi, D. Derks, and D. Bonn, *An attempt to categorize yield stress fluid behaviour*. Philosophical Transactions of the Royal Society A: Mathematical, Physical and Engineering Sciences, 2009. 367(1909): p. 5139-5155.

4. Møller, P., A. Fall, and D. Bonn, *Origin of apparent viscosity in yield stress fluids below yielding*. EPL (Europhysics Letters), 2009. 87(3): p. 38004.

5. Mattsson, J., H. M. Wyss, A. Fernandez-Nieves, K. Miyazaki, Z. Hu, D. R. Reichman, and D. A. Weitz, *Soft colloids make strong glasses*. Nature, 2009. 462(7269): p. 83-86.

6. Coussot, P., L. Tocquer, C. Lanos, and G. Ovarlez, *Macroscopic vs. local rheology of yield stress fluids*. Journal of non-newtonian fluid mechanics, 2009. 158(1): p. 85-90.

7. Steinberg, M. S., *Does differential adhesion govern self-assembly processes in histogenesis? Equilibrium configurations and the emergence of a hierarchy among populations of embryonic cells*. Journal of Experimental Zoology, 1970. 173(4): p. 395-433.

8. Steinberg, M. S. and L. L. Wiseman, *Do morphogenetic tissue rearrangements require active cell movements? The reversible inhibition of cell sorting and tissue spreading by cytochalasin B*. The Journal of cell biology, 1972. 55(3): p. 606-615.

9. Steinberg, M. S., *Differential adhesion in morphogenesis: a modern view*. Current opinion in genetics & development, 2007. 17(4): p. 281-286.

10. Schötz, E. M., R. D. Burdine, F. Jülicher, M. S. Steinberg, C. P. Heisenberg, and R. A. Foty, *Quantitative differences in tissue surface tension influence zebrafish germ layer positioning*. HFSP journal, 2008. 2(1): p. 42-56.

11. Eastwood, M., D. A. McGrouther, and R. A. Brown, *A culture force monitor for measurement of contraction forces generated in human dermal fibroblast cultures: evidence for cell-matrix mechanical signalling*. Biochimica et Biophysica Acta (BBA)—General Subjects, 1994. 1201(2): p. 186-192.

12. Zaman, M. H., L. M. Trapani, A. L. Sieminski, D. MacKellar, H. Gong, R. D. Kamm, A. Wells, D. A. Lauffenburger, and P. Matsudaira, *Migration of tumor cells in 3D matrices is governed by matrix stiffness along with cell-matrix adhesion and proteolysis*. Proceedings of the National Academy of Sciences, 2006. 103(29): p. 10889-10894.

13. Provenzano, P. P., D. R. Inman, K. W. Eliceiri, S. M. Trier, and P. J. Keely, *Contact guidance mediated three-dimensional cell migration is regulated by Rho/ROCK-dependent matrix reorganization*. Biophysical journal, 2008. 95(11): p. 5374-5384.

14. Kraning-Rush, C. M., S. P. Carey, J. P. Califano, B. N. Smith, and C. A. Reinhart-King, *The role of the cytoskeleton in cellular force generation in 2D and 3D environments*. Physical biology, 2011. 8(1): p. 015009.

15. Lutolf, M., J. Lauer-Fields, H. Schmoekel, A. Metters, F. Weber, G. Fields, and J. Hubbell, *Synthetic matrix metalloproteinase-sensitive hydrogels for the conduction of tissue regeneration: engineering cell-invasion characteristics*. Proceedings of the National Academy of Sciences, 2003. 100(9): p. 5413-5418.

16. Raeber, G., M. Lutolf, and J. Hubbell, *Molecularly engineered PEG hydrogels: a novel model system for proteolytically mediated cell migration*. Biophysical journal, 2005. 89(2): p. 1374-1388.

17. Beningo, K. A., C.-M. Lo, and Y.-L. Wang, *Flexible polyacrylamide substrata for the analysis of mechanical interactions at cell-substratum adhesions*. Methods in cell biology, 2002. 69: p. 325-339.

18. Marshall, A. J., C. A. Irvin, T. Barker, E. H. Sage, K. D. Hauch, And B. D. Ratner, *Biomaterials with tightly controlled pore size that promote vascular in-growth*. Polymer Preprints, American Chemical Society, Division of Polymer Chemistry, 2004. 45(2): p. 100-101.

19. Isenhath, S., Y. Fukano, M. Usui, R. Underwood, C. Irvin, A. Marshall, K. Hauch, B. Ratner, P. Fleckman, and J. Olerud, *A mouse model to evaluate the interface between skin and a percutaneous device*. Journal of Biomedical Materials Research Part A, 2007. 83(4): p. 915-922.

20. Madden, L. R., D. J. Mortisen, E. M. Sussman, S. K. Dupras, J. A. Fugate, J. L. Cuy, K. D. Hauch, M. A. Laflamme, C. E. Murry, and B. D. Ratner, *Proangiogenic scaffolds as functional templates for cardiac tissue engineering*. Proceedings of the National Academy of Sciences, 2010. 107(34): p. 15211-15216.

21. Linnes, M. P., B. D. Ratner, and C. M. Giachelli, *A fibrinogen-based precision microporous scaffold for tissue engineering*. Biomaterials, 2007. 28(35): p. 5298-5306.

22. Ratner, B. D. and S. Atzet, *Hydrogels for healing*, in *Hydrogels* 2009, Springer. p. 43-51.

23. Barry, R. A., R. F. Shepherd, J. N. Hanson, R. G. Nuzzo, P. Wiltzius, and J. A. Lewis, *Direct-Write Assembly of 3D Hydrogel Scaffolds for Guided Cell Growth*. Advanced Materials, 2009. 21(23): p. 2407-2410.

24. Shepherd, J. N. H., S. T. Parker, R. F. Shepherd, M. U. Gillette, J. A. Lewis, and R. G. Nuzzo, *3D microperiodic hydrogel scaffolds for robust neuronal cultures*. Advanced functional materials, 2011. 21(1): p. 47.

25. Sun, L., S. T. Parker, D. Syoji, X. Wang, J. A. Lewis, and D. L. Kaplan, *Direct-Write Assembly of 3D Silk/Hydroxyapatite Scaffolds for Bone Co-Cultures*. Advanced healthcare materials, 2012. 1(6): p. 729-735.

26. Miller, J. S., K. R. Stevens, M. T. Yang, B. M. Baker, D. H. T. Nguyen, D. M. Cohen, E. Toro, A. A. Chen, P. A. Galie, and X. Yu, *Rapid casting of patterned vascular networks for perfusable engineered three-dimensional tissues*. Nature materials, 2012.

27. Greiner, A. M., B. Richter, and M. Bastmeyer, *Micro-Engineered 3D Scaffolds for Cell Culture Studies*. Macromolecular bioscience, 2012. 12(10): p. 1301-1314.

28. Xu, C., W. Chai, Y. Huang, and R. R. Markwald, *Scaffold-free inkjet printing of three-dimensional zigzag cellular tubes*. Biotechnology and Bioengineering, 2012. 109(12): p. 3152-3160.

29. Gilbert, T. W., T. L. Sellaro, and S. F. Badylak, *Decellularization of tissues and organs*. Biomaterials, 2006. 27(19): p. 3675-3683.

30. Crapo, P. M., T. W. Gilbert, and S. F. Badylak, *An overview of tissue and whole organ decellularization processes*. Biomaterials, 2011. 32(12): p. 3233-3243.

31. Amensag, S. and P. S. McFetridge, *Rolling the human amnion to engineer laminated vascular tissues*. Tissue Engineering Part C: Methods, 2012. 18(11): p. 903-912.

32. Amensag, S. and P. S. McFetridge, *Tuning scaffold mechanics by laminating native extracellular matrix membranes and effects on early cellular remodeling*. Journal of Biomedical Materials Research Part A, 2013.

33. Jin, C. Z., S. R. Park, B. H. Choi, K.-Y. Lee, C. K. Kang, and B.-H. Min, *Human amniotic membrane as a delivery matrix for articular cartilage repair*. Tissue engineering, 2007. 13(4): p. 693-702.

34. Mligiliche, N., K. Endo, K. Okamoto, E. Fujimoto, and C. Ide, *Extracellular matrix of human amnion manu-* factured into tubes as conduits for peripheral nerve regeneration. Journal of biomedical materials research, 2002. 63(5): p. 591-600.

35. Mohammad, J., J. Shenaq, E. Rabinovsky, and S. Shenaq, *Modulation of peripheral nerve regeneration: a tissue-engineering approach. The role of amnion tube nerve conduit across a 1-centimeter nerve gap*. Plastic and reconstructive surgery, 2000. 105(2): p. 660-666.

36. Ott, H. C., T. S. Matthiesen, S.-K. Goh, L. D. Black, S. M. Kren, T. I. Netoff, and D. A. Taylor, *Perfusion-decellularized matrix: using nature's platform to engineer a bioartificial heart*. Nature medicine, 2008. 14(2): p. 213-221.

37. Petersen, T. H., E. A. Calle, L. Zhao, E. J. Lee, L. Gui, M. B. Raredon, K. Gavrilov, K. Yi, Z. W. Zhuang, and C. Breuer, *Tissue-engineered lungs for in vivo implantation*. Science, 2010. 329(5991): p. 538-541.

38. Guo, S., X. Ren, B. Wu, and T. Jiang, *Preparation of the acellular scaffold of the spinal cord and the study of biocompatibility*. Spinal cord, 2010. 48(7): p. 576-581.

39. Uygun, B. E., A. Soto-Gutierrez, H. Yagi, M.-L. Izamis, M. A. Guzzardi, C. Shulman, J. Milwid, N. Kobayashi, A. Tilles, and F. Berthiaume, *Organ reengineering through development of a transplantable recellularized liver graft using decellularized liver matrix*. Nature medicine, 2010. 16(7): p. 814-820.

40. Baiguera, S., P. Jungebluth, A. Burns, C. Mavilia, J. Haag, P. De Coppi, and P. Macchiarini, *Tissue engineered human tracheas for in vivo implantation*. Biomaterials, 2010. 31(34): p. 8931-8938.

41. Roberts, G. P. and H. A. Barnes, *New measurements of the flow-curves for Carbopol dispersions without slip artefacts*. Rheologica acta, 2001. 40(5): p. 499-503.

42. Piau, J., *Carbopol gels: Elastoviscoplastic and slippery glasses made of individual swollen sponges: Meso-and macroscopic properties, constitutive equations and scaling laws*. Journal of non-newtonian fluid mechanics, 2007. 144(1): p. 1-29.

43. Barnes, H. A., *The yield stress—a review or 'παντα ρει'—everything flows?* Journal of non-newtonian fluid mechanics, 1999. 81(1): p. 133-178.

44. Møller, P. C., J. Mewis, and D. Bonn, *Yield stress and thixotropy: on the difficulty of measuring yield stresses in practice*. Soft matter, 2006. 2(4): p. 274-283.

45. Romeo, G., A. Fernandez-Nieves, H. M. Wyss, D. Acierno, and D. A. Weitz, *Temperature-Controlled Transitions Between Glass, Liquid, and Gel States in Dense p-NIPA Suspensions*. Advanced Materials, 2010. 22(31): p. 3441-3445.

46. Bindschadler, M. and J. L. McGrath, *Sheet migration by wounded monolayers as an emergent property of single-cell dynamics*. J Cell Sci, 2007. 120(5): p. 876-884.

47. Trepat, X., M. R. Wasserman, T. E. Angelini, E. Millet, D. A. Weitz, J. P. Butler, and J. J. Fredberg, *Physical forces during collective cell migration*. Nat Phys, 2009. 5.

48. Poujade, M., E. Grasland-Mongrain, A. Hertzog, J. Jouanneau, P. Chavrier, B. Ladoux, A. Buguin, and P. Silberzan, *Collective migration of an epithelial monolayer in response to a model wound*. Proceedings of the National Academy of Sciences, 2007. 104(41): p. 15988-15993.

49. Szabo, B., G. J. Szollosi, B. Gonci, Z. Juranyi, D. Selmeczi, and T. Vicsek, *Phase transition in the collective migration of tissue cells: Experiment and model*. Physical Review E (Statistical, Nonlinear, and Soft Matter Physics), 2006. 74(6): p. 061908-5.

50. Kurten, R. C., P. Chowdhury, R. C. Sanders, Jr., L. M. Pittman, L. W. Sessions, T. C. Chambers, C. S. Lyle, B. J. Schnackenberg, and S. M. Jones, *Coordinating epidermal growth factor-induced motility promotes efficient wound closure*. Am J Physiol Cell Physiol, 2005. 288(1): p. C109-121.

51. Haga, H., C. Irahara, R. Kobayashi, T. Nakagaki, and K. Kawabata, *Collective Movement of Epithelial Cells on a Collagen Gel Substrate*. Biophysical Journal, 2005. 88(3): p. 2250-2256.

52. Farooqui, R. and G. Fenteany, *Multiple rows of cells behind an epithelial wound edge extend cryptic lamellipodia to collectively drive cell-sheet movement*. J Cell Sci, 2005. 118(1): p. 51-63.

53. Tambe, D. T., C. C. Hardin, T. E. Angelini, K. Rajendran, C. Y. Park, X. Serra-Picamal, E. H. Zhou, M. H. Zaman, J. P. Butler, and D. A. Weitz, *Collective cell guidance by cooperative intercellular forces*. Nature materials, 2011. 10(6): p. 469-475.

54. Angelini, T. E., E. Hannezo, X. Trepat, J. J. Fredberg, and D. A. Weitz, *Cell Migration Driven by Cooperative Substrate Deformation Patterns*. Physical Review Letters, 2010. 104(16): p. 168104.

55. Angelini, T. E., E. Hannezo, X. Trepat, M. Marquez, J. J. Fredberg, and D. A. Weitz, *Glass-like dynamics of collective cell migration*. Proceedings of the National Academy of Sciences, 2011. 108(12): p. 4714-4719.

56. Suaris, M., J. A. Breaux, S. P. Zehnder, and T. E. Angelini. *Nucleation and growth of epithelial cell clusters in AIP Conference Proceedings*. 2013.

57. Saunders, B. R. & Vincent, B. *Microgel particles as model colloids: theory, properties and applications*. Advances in Colloid and Interface Science 80, 1-25 (1999).

58. O'Hern, C. S., Silbert, L. E., Liu, A. J. & Nagel, S. R. *Jamming at zero temperature and zero applied stress: The epitome of disorder*. Physical Review E 68, 011306 (2003).

59. Liu, A. J. & Nagel, S. R. *Nonlinear dynamics: Jamming is not just cool any more*. Nature 396, 21-22 (1998).

60. Cates, M., Wittmer, J., Bouchaud, J.-P. & Claudin, P. *Jamming, force chains, and fragile matter*. Physical review letters 81, 1841 (1998).

61. Liu, A. J. & Nagel, S. R. *Jamming and rheology: constrained dynamics on microscopic and macroscopic scales*. (CRC Press, 2001).

62. Bi, D., Zhang, J., Chakraborty, B. & Behringer, R. *Jamming by shear*. Nature 480, 355-358 (2011).

63. Corwin, E. I., Jaeger, H. M. & Nagel, S. R. *Structural signature of jamming in granular media*. Nature 435, 1075-1078 (2005).

64. Schweizer, K. S. & Yatsenko, G. *Collisions, caging, thermodynamics, and jamming in the barrier hopping theory of glassy hard sphere fluids*. The Journal of chemical physics 127, 164505 (2007).

65. Cho, E. C., Kim, J.-W., Fernández-Nieves, A. & Weitz, D. A. *Highly responsive hydrogel scaffolds formed by three-dimensional organization of microgel nanoparticles*. Nano letters 8, 168-172 (2008).

66. Fernandez-Nieves, A., Wyss, H., Mattsson, J. & Weitz, D. A. *Microgel suspensions: fundamentals and applications*. (John Wiley & Sons, 2010).

67. Debord, J. D., Eustis, S., Byul Debord, S., Lofye, M. T. & Lyon, L. A. *Color-Tunable Colloidal Crystals from Soft Hydrogel Nanoparticles*. Advanced materials 14, 658-662 (2002).

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the attached claims, various elements are recited in different claims. However, the claimed elements, even if recited in separate claims, may be used together in any suitable combination.

What is claimed is:

1. A method for creating a three-dimensional structure within a first material, the method comprising:
    causing a phase change in a region of the first material by applying focused energy to the region using a focused energy source; and
    displacing the first material in the region with a second material,
    wherein the first material is a Herschel-Bulkley material having a yield stress less than 100 Pascals, and
    wherein the first material comprises a soft granular gel made from polymeric packed micro-particles.

2. The method of claim 1, wherein the focused energy source is configured to cause a reverse phase change in the region of the first material.

3. The method of claim 1, wherein the polymeric packed micro-particles are between 0.1 and 100 micrometers in diameter.

4. The method of claim 1, wherein the polymeric packed micro-particles are at a concentration by weight in the soft granular gel of less than 2%.

5. The method of claim 1, wherein the first material comprises a hydrogel.

6. The method of claim 5, wherein the hydrogel comprises crosslinked polymers of acrylic acid.

7. The method of claim 5, wherein the hydrogel comprises a polyelectrolytic microgel.

8. The method of claim 1, wherein the first material comprises a silicone elastomer dispersion.

9. The method of claim 8, wherein the silicone elastomer dispersion comprises a silicone elastomer dispersed in PDMS.

10. The method of claim 1, wherein a shear stress of the first material is independent of shear rate at a shear rate of $10^{-3} s^{-1}$.

11. The method of claim 1, wherein the yield stress of the first material is below a hydrostatic pressure of the first material.

12. The method of claim 1, wherein the first material has a thixotropic time between 0.25 seconds and 2.5 seconds.

13. The method of claim 1, wherein the first material has a thixotropic index between 4 and 7.

14. The method of claim 1, wherein the first material and the second material are miscible.

15. The method of claim 1, wherein the displacing comprises:
    injecting, with an injector, the second material into the first material; and
    over time, relatively displacing the first material with respect to the injector.

16. The method of claim 15, wherein the relatively displacing the first material with respect to the injector comprises relative rotation of the first material with respect to the injector.

17. The method of claim 1, wherein the displacing comprises, over time, relatively displacing a focus point of the focused energy source with respect to the first material.

18. The method of claim 17, wherein:
    the displacing further comprises injecting, with an injector, the second material into the first material and moving the injector over time; and
    the relatively displacing comprises synchronizing motion of the injector with the relatively displacing of the focus point of the focused energy source.

* * * * *